US009918341B2

(12) United States Patent
Papaleo et al.

(10) Patent No.: US 9,918,341 B2
(45) Date of Patent: Mar. 13, 2018

(54) CLEAR CHANNEL ASSESSMENT PROCEDURE AT MASTER AND SLAVE DEVICES

(71) Applicant: QUALCOMM Incorporated, San Diego, CA (US)

(72) Inventors: Marco Papaleo, San Diego, CA (US); Srinivas Yerramalli, San Diego, CA (US); Aleksandar Damnjanovic, Del Mar, CA (US); Tao Luo, San Diego, CA (US); Peter Gaal, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 15/153,516

(22) Filed: May 12, 2016

(65) Prior Publication Data

US 2016/0345360 A1    Nov. 24, 2016

Related U.S. Application Data

(60) Provisional application No. 62/165,861, filed on May 22, 2015.

(51) Int. Cl.
H04W 4/00       (2009.01)
H04W 74/08      (2009.01)
(Continued)

(52) U.S. Cl.
CPC ....... H04W 74/08 (2013.01); H04W 72/0446 (2013.01); H04W 72/1289 (2013.01); H04W 84/20 (2013.01)

(58) Field of Classification Search
CPC ............. H04W 74/08; H04W 72/0446; H04W 72/1289; H04W 84/20
See application file for complete search history.

(56) References Cited

U.S. PATENT DOCUMENTS 9,648,613 B2*  5/2017  Choi ................. H04W 72/0446
9,743,353 B2*  8/2017  Kim .................. H04W 52/0225
(Continued)

OTHER PUBLICATIONS

Fujitsu: "Evaluation Results for DL+UL LAA and Wi-Fi", 3GPP Draft, R1-152654 Evaluation Results for DL+UL LAA and WiFi Final, 3rd Generation Partnership Project (3GPP), Mobile Competence Centre, 650, Route Des Lucioles, F-06921 Sophia-Antipolis Cedex, vol. RAN WG1, no. Fukuoka, Japan, May 25, 2015-May 29, 2015 May 15, 2015 (May 15, 2015), pp. 5, XP050972284, Retrieved from the Internet: URL:http://www.3gpp.org/ftp/tsg_ran/WG1_RL1/TSGR1_81/Docs/ [retrieved on May 15, 2015] the whole document.

(Continued)

Primary Examiner — Clemence Han
(74) Attorney, Agent, or Firm — Nerrie M. Zohn

(57) ABSTRACT

In order to provide a generic access rule, the present disclosure proposes a new potential set of adaptivity rules for LBE based on LBT. The generic access rule of the present disclosure provides LTE-U and Wi-Fi coexistence and DL/UL coexistence in both LTE-U and Wi-Fi. The apparatus receives, from the first master device, a resource allocation for communicating with the second master device. The apparatus also determines a type of CCA procedure to perform before communicating with the second master device on an unlicensed channel. The apparatus further performs a CCA procedure to obtain a transmission opportunity based on the determining, the CCA procedure being one of an ICCA procedure or an ECCA procedure. In addition, the apparatus transmit data to the second master (Continued)

device in accordance with the resource allocation on the unlicensed channel when the transmission opportunity is obtained.

26 Claims, 20 Drawing Sheets

(51) Int. Cl.
*H04W 72/04* (2009.01)
*H04W 84/20* (2009.01)
*H04W 72/12* (2009.01)

(56) References Cited

U.S. PATENT DOCUMENTS

| | | | | |
|---|---|---|---|---|
| 2009/0258603 | A1* | 10/2009 | Ghaboosi | H04W 74/002 455/68 |
| 2015/0092703 | A1* | 4/2015 | Xu | H04L 5/003 370/329 |
| 2015/0156722 | A1* | 6/2015 | Kim | H04W 74/08 370/311 |
| 2015/0230244 | A1* | 8/2015 | Choi | H04L 1/1614 370/329 |
| 2015/0230245 | A1* | 8/2015 | Choi | H04W 74/0816 370/329 |
| 2016/0309354 | A1* | 10/2016 | Yerramalli | H04W 24/08 |
| 2016/0338104 | A1* | 11/2016 | Yin | H04W 72/0446 |
| 2017/0041952 | A1* | 2/2017 | Kim | H04W 74/08 |
| 2017/0215157 | A1* | 7/2017 | Yang | H04W 52/367 |
| 2017/0215172 | A1* | 7/2017 | Yang | H04W 72/042 |
| 2017/0230986 | A1* | 8/2017 | Moon | H04W 72/085 |

OTHER PUBLICATIONS

International Search Report and Written Opinion—PCT/US2016/032476—ISA/EPO—Aug. 12, 2016.
ZTE: "Consideration on Exploiting LAA Scells more Efficiently", 3GPP Draft, R2-152332 Consideration on Exploiting LAA Scells More Efficiently, 3rd Generation Partnership Project (3GPP), Mobile Competence Centre, 650, Route Des Lucioles, F-06921 Sophia-Antipolis vol. RAN WG2, no. Fukuoka, Japan; May 25, 2015-May 29, 2015 May 15, 2015 (May 15, 2015), pp. 1-4, XP050971033, Retrieved from the Internet: URL:http://www.3gpp.org/ftp/tsg_ran/WG2_RL2/TSGR2_90/Docs/ [retrieved on May 15, 2015] paragraph [0002], figure 2.

* cited by examiner

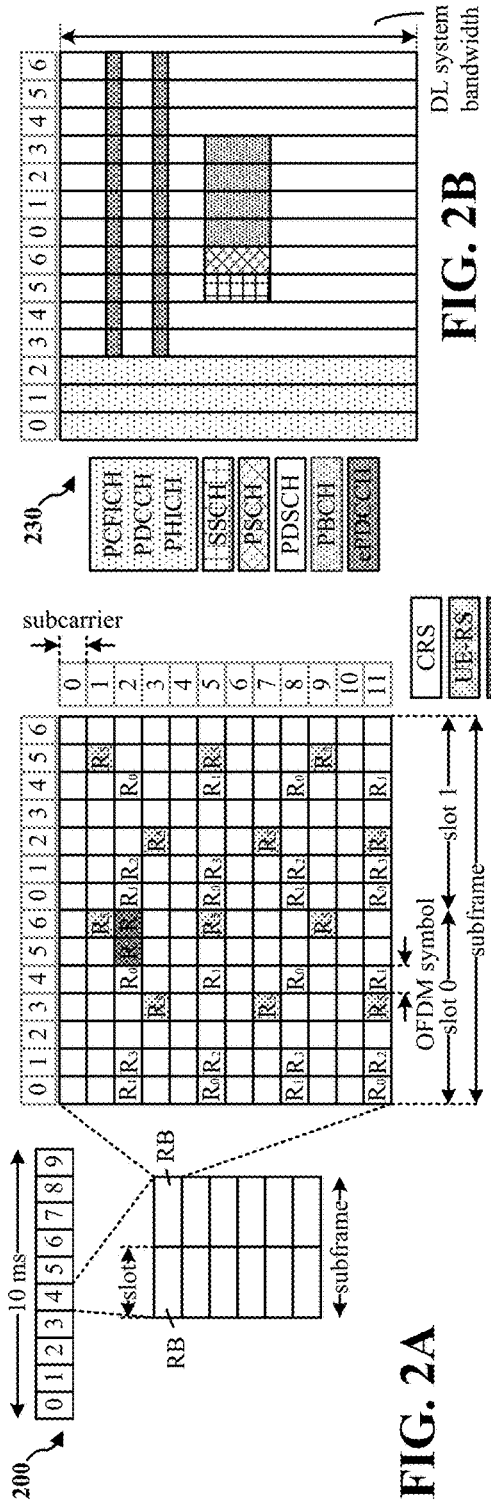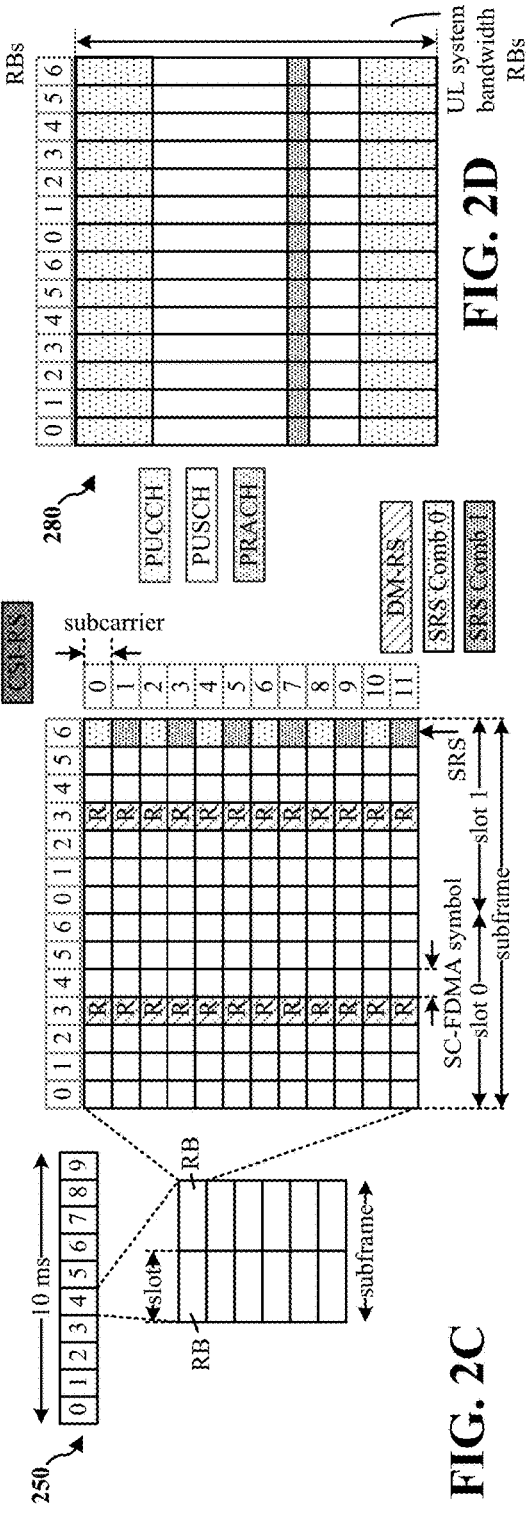
FIG. 2A  FIG. 2B  FIG. 2C  FIG. 2D

CLEAR CHANNEL ASSESSMENT PROCEDURE AT MASTER AND SLAVE DEVICES

CROSS-REFERENCE TO RELATED APPLICATION(S)

This application claims the benefit of U.S. Provisional Application Ser. No. 62/165,861, entitled "CCA PROCEDURE AT MASTER AND SLAVE DEVICES" and filed on May 22, 2015, which is expressly incorporated by reference herein in its entirety.

BACKGROUND

Field

The present disclosure relates generally to communication systems, and more particularly, to using an unlicensed radio frequency spectrum band for at least a portion of contention-based communications over a wireless communication system.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the DL, SC-FDMA on the UL, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the contention-based shared radio frequency spectrum band is available. When it is determined that the channel of the contention-based shared radio frequency spectrum band is available, a channel reserving signal, such as a channel usage beacon signal (CUBS) may be transmitted to reserve the channel.

There is an unmet need for coordinating an LBT procedure among base stations and UEs, where one base station helps coordinate the process for another (type of) BS. For example, there is a need for a licensed BS to support the unlicensed BS, or one unlicensed BS supports another unlicensed BS.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the contention-based shared radio frequency spectrum band is available. When it is determined that the channel of the contention-based shared radio frequency spectrum band is available, a channel reserving signal, such as a channel usage beacon signal (CUBS) may be transmitted to reserve the channel.

There is an unmet need for coordinating an LBT procedure among base stations and UEs, where one base station helps coordinate the process for another (type of) BS. For example, there is a need for a licensed BS to support the unlicensed BS, or one unlicensed BS supports another unlicensed BS.

In order to coordinate an LBT procedure among base stations and UEs, the present disclosure proposes a new potential set of adaptivity rules for Load Based Equipment (LBE) based on Listen Before Talk (LBT). The the LBT procedure of the present disclosure provides LTE-unlicensed (LTE-U) and Wi-Fi coexistence and DL/UL coexistence in both LTE-U and Wi-Fi.

In an aspect of the disclosure, a method, a computer-readable medium, and an apparatus are provided. The apparatus receives, from the first master device, a resource allocation for communicating with the second master device. The apparatus also determines a type of CCA procedure to perform before communicating with the second master device on an unlicensed channel. The apparatus further performs a CCA procedure to obtain a transmission opportunity based on the determining, the CCA procedure being one of an initial CCA (ICCA) procedure or an extended CCA (ECCA) procedure. In addition, the apparatus transmit data to the second master device in accordance with the resource allocation on the unlicensed channel when the transmission opportunity is obtained.

In a further aspect, the apparatus transmits a resource allocation to a slave device for communicating with the second master device. The apparatus transmits information of the resource allocation to the second master device on a backhaul link. The apparatus further indicates a CCA type and CCA parameters to the slave device by at least one of providing configuration information in a communication prior to transmitting the resource allocation, setting an indicator in the resource allocation, transmitting the resource allocation on a type of channel, or transmitting the resource allocation on a selected channel.

In another aspect, the apparatus receives, from the second master device, information of the resource allocation to the first master device on a backhaul link, the resource allocation being transmitted on a licensed channel, and the information of the resource allocation including an indication to reserve the unlicensed channel. The apparatus also receives data in accordance with the resource allocation on an unlicensed channel from the slave device. The apparatus further performs, at the first master device, an ICCA procedure or an ECCA procedure to obtain a transmission opportunity on the unlicensed channel prior to the reception of the data. The apparatus further occupies, by the first master device, the unlicensed channel at the transmission opportunity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
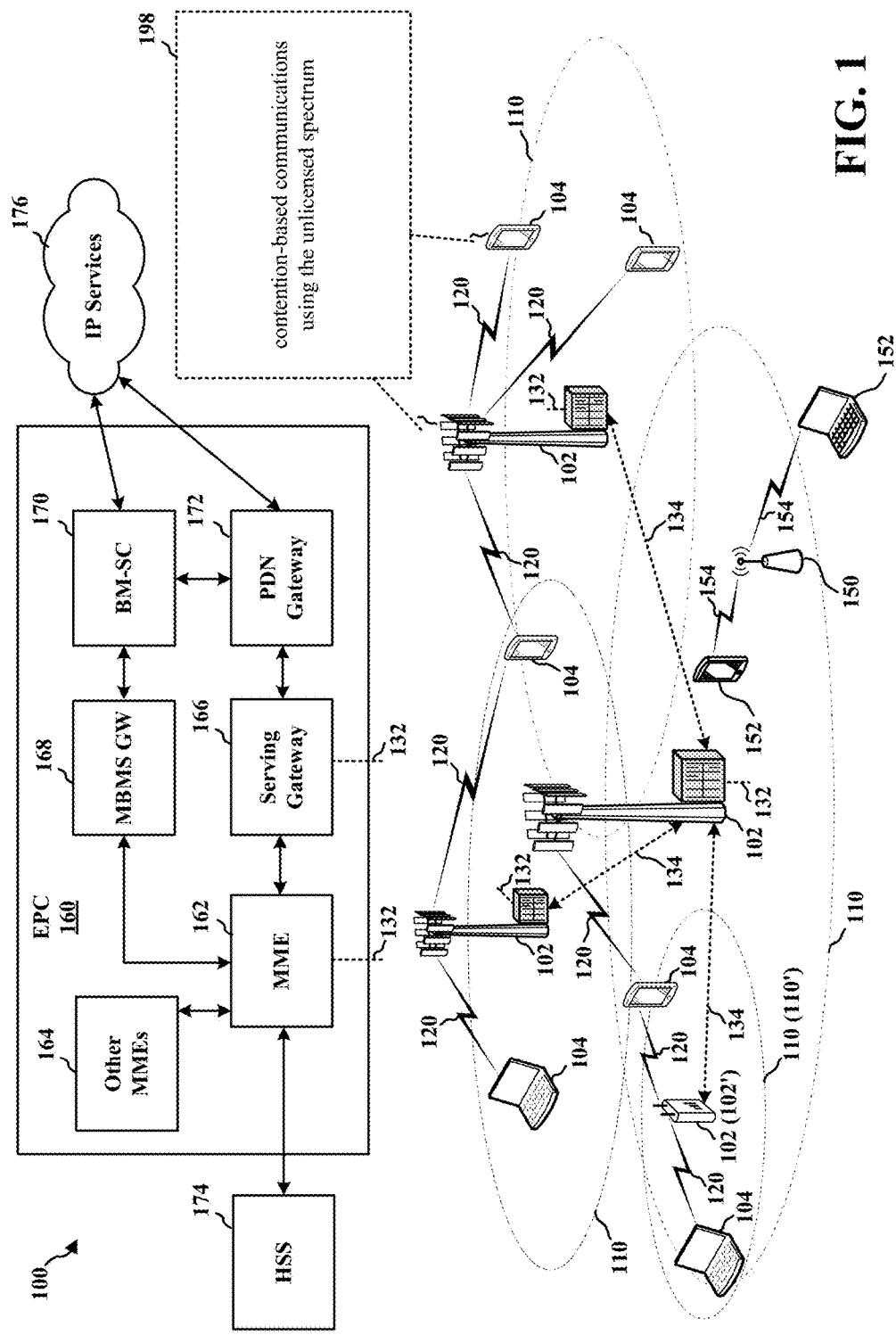
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP- GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include UL (also referred to as reverse link) transmissions from a UE 104 to a base station 102 and/or DL (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), and may employ techniques associated with licensed assisted access (LAA) or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured for contention-based communications using the unlicensed spectrum (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
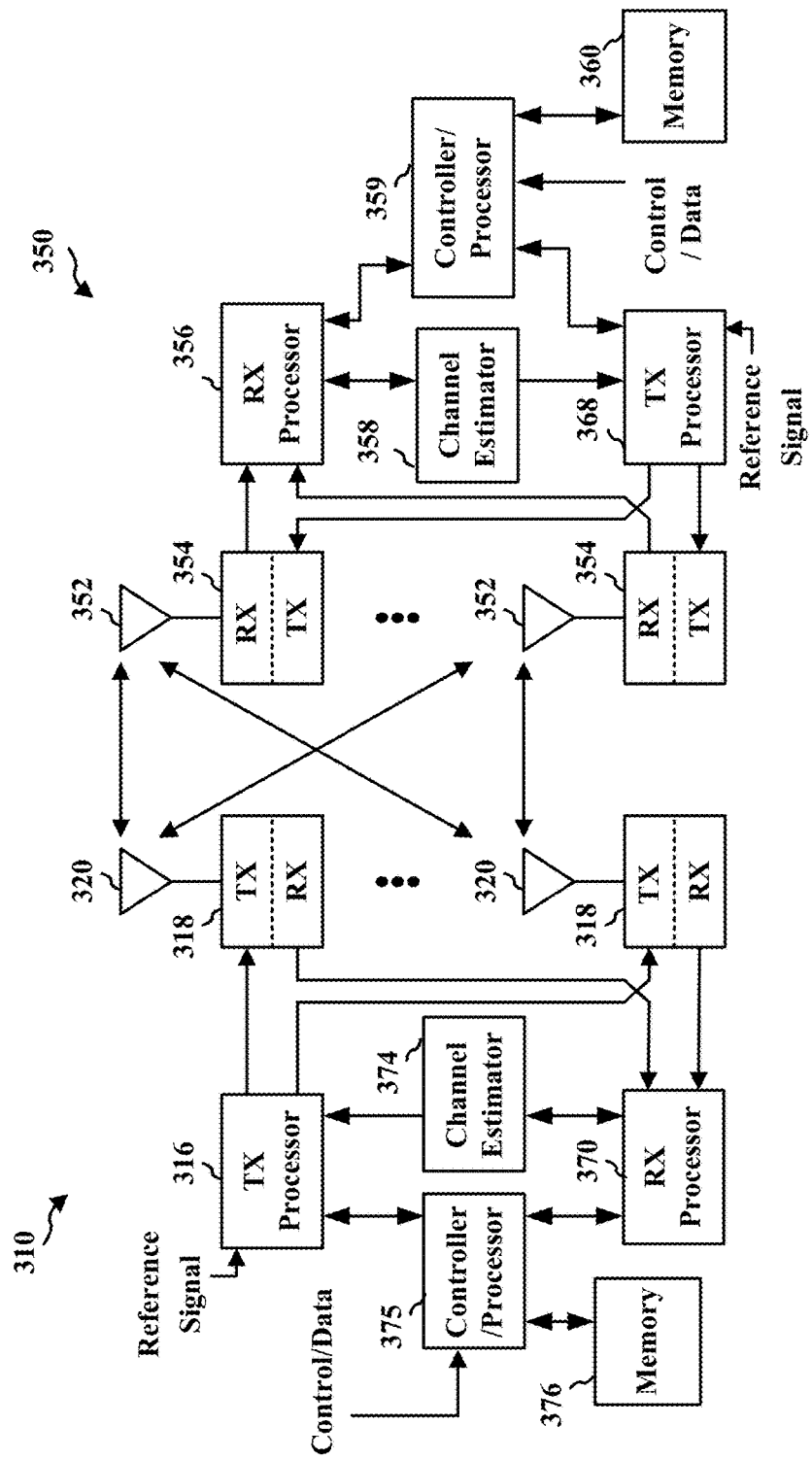
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the contention-based shared radio frequency spectrum band is available. When it is determined that the channel of the contention-based shared radio frequency spectrum band is available, a channel reserving signal, such as a channel usage beacon signal (CUBS) may be transmitted to reserve the channel.

There is an unmet need for coordinating an LBT procedure among base stations and UEs, where one base station helps coordinate the process for another (type of) BS. For example, there is a need for a licensed BS to support the unlicensed BS, or one unlicensed BS supports another unlicensed BS.

In order to coordinate an LBT procedure among base stations and UEs, the present disclosure proposes a new potential set of adaptivity rules for Load Based Equipment (LBE) based on Listen Before Talk (LBT). The the LBT procedure of the present disclosure provides LTE-unlicensed (LTE-U) and Wi-Fi coexistence and DL/UL coexistence in both LTE-U and Wi-Fi.

Figure 4:
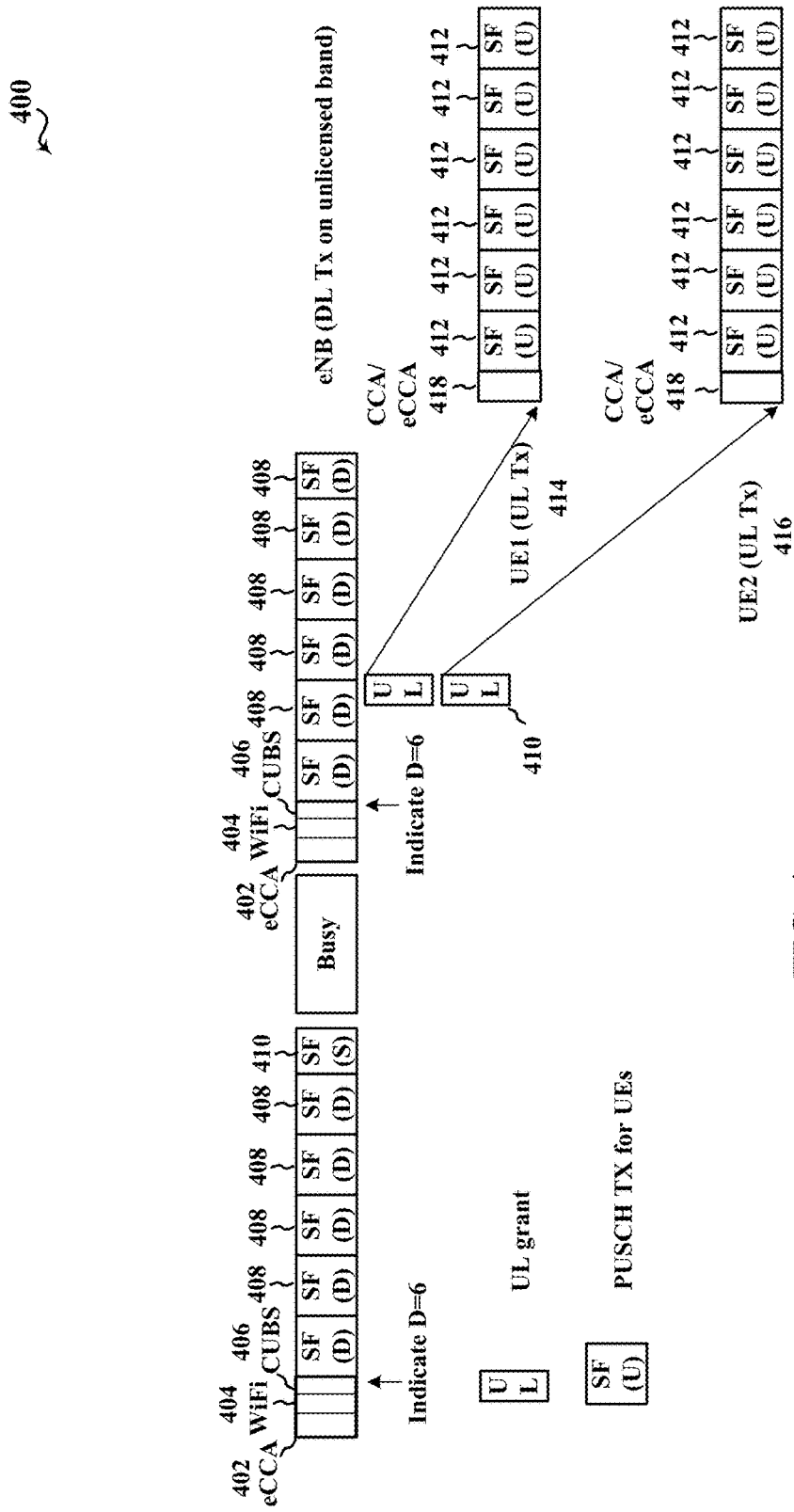
FIG. 4 shows a diagram that illustrates an example of wireless communication using an unlicensed spectrum according to aspects of the present disclosure.

FIG. 4 is an illustration of an example 400 of a wireless communication over an unlicensed radio frequency spectrum band, in accordance with various aspects of the present disclosure. FIG. 4 illustrates a downlink clear channel assessment (CCA) procedure 402 may be performed by one or more base stations, such as one or more of the base stations 102 described with reference to FIG. 1 to reserve, for a period of time, a channel of the contention-based shared radio frequency spectrum band over which the wireless communication occurs. Following a successful downlink CCA procedure 445 by a base station, the base station may transmit a preamble, such as a Wi-Fi preamble 404 and/or channel usage beacon signal (CUBS) 406 (e.g., a downlink CUBS (D-CUBS 450)) to provide an indication to other base stations or apparatuses (e.g., UEs, Wi-Fi access points, etc.) that the base station has reserved the channel.

The eNB may then transmit a number of downlink (D) subframes 408. The eNB may transmit an indication of a number of DL subframes that it will transmit, e.g., in FIG. 4, the an indication is provided by the eNB that it will transmit 6 D subframes. There may also be a special subframe (S) 410, which may be a transition subframe, e.g., between D and U subframes. Some of the D subframes may include a grant 410 to a UE(s) to transmit UL communication during a number of uplink (U) subframes 412. FIG. 4 illustrates UL grants communicated to two different UEs, UE1 414 and UE2 416. UE1 and UE2 may be, e.g., one or more of the UEs 104 described above with reference to FIG. 1. Based on the UL grant 410, UE1 414 and UE2 416 may perform a CCA or extended CCA (ECCA) procedure 418, and when successful transmit a number of UL subframes 412 according to the UL grant 410.

As indicated above, FIG. 4 is provided as an example. Other examples are possible and may differ from what was described in connection with FIG. 4.

Figure 5:
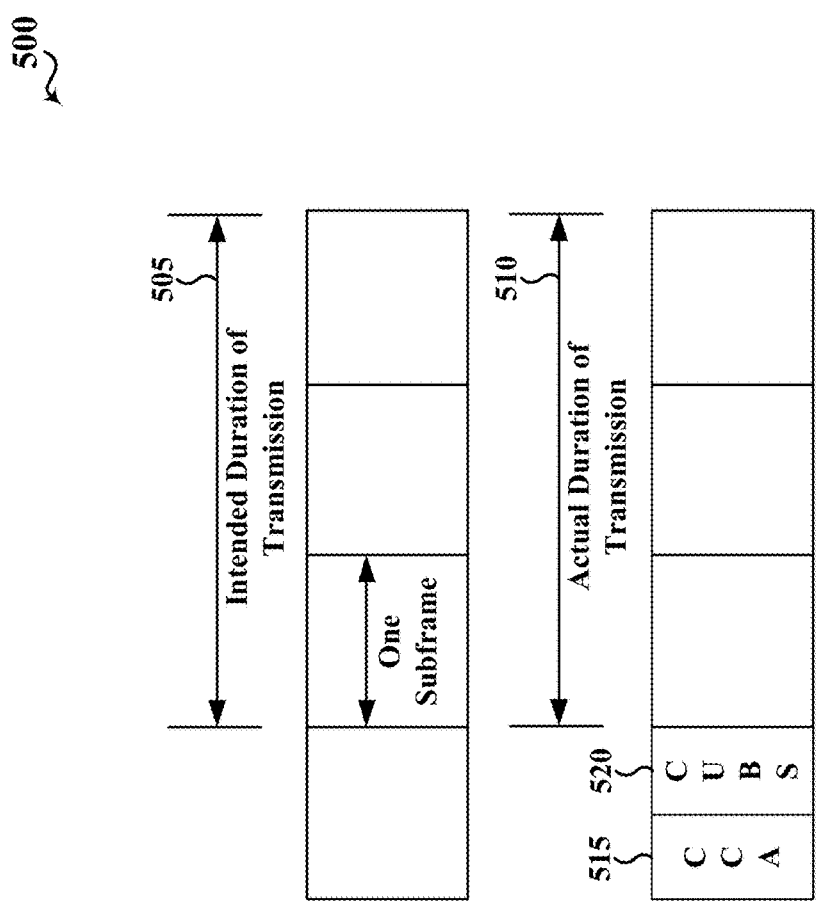
FIG. 5 is an illustration of an example of a CCA procedure performed by a transmitting apparatus when contending for access to a contention-based shared radio frequency spectrum band, in accordance with various aspects of the present disclosure.

FIG. 5 is an illustration of an example 500 of a CCA procedure 515 performed by a transmitting apparatus when contending for access to a contention-based shared radio frequency spectrum band, in accordance with various aspects of the present disclosure. In some examples, the CCA procedure 515 may be an example of the DL CCA procedure 445 or UL CCA procedure 465 described with reference to FIG. 4. The CCA procedure 515 may have a fixed duration. In some examples, the CCA procedure 515 may be performed in accordance with an LBT-frame based equipment (LBT-FBE) protocol (e.g., the LBT-FBE protocol described by EN 301 893). Following the CCA procedure 515, a channel reserving signal, such as a CUBS 520, may be transmitted, followed by a data transmission (e.g., an UL transmission or a DL transmission). By way of example, the data transmission may have an intended duration 505 of three subframes and an actual duration 510 of three subframes.

As indicated above, FIG. 5 is provided as an example. Other examples are possible and may differ from what was described in connection with FIG. 5.

Figure 6:
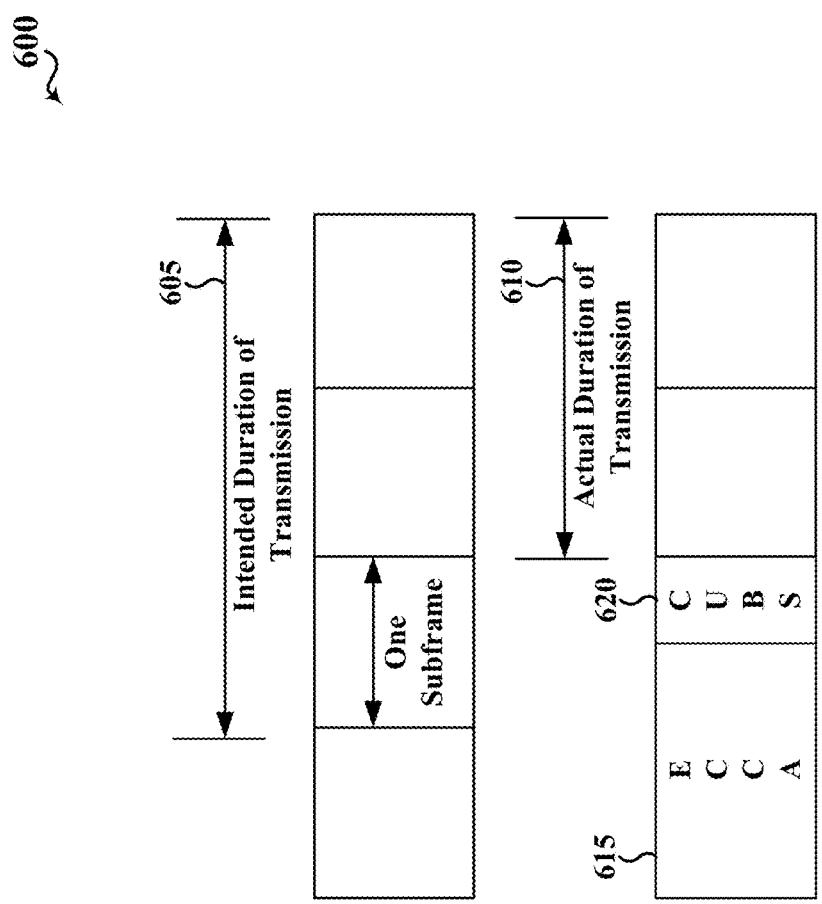
FIG. 6 is an illustration of an example of an extended CCA (ECCA) procedure performed by a transmitting apparatus when contending for access to a contention-based shared radio frequency spectrum band, in accordance with various aspects of the present disclosure.

FIG. 6 is an illustration of an example 600 of an extended CCA (ECCA) procedure 615 performed by a transmitting apparatus when contending for access to a contention-based shared radio frequency spectrum band, in accordance with various aspects of the present disclosure. In some examples, the ECCA procedure 615 may be an example of the DL CCA procedure 445 or UL CCA procedure 465 described with reference to FIG. 4. The ECCA procedure 615 may include a random number of CCA procedures, and in some examples may include a plurality of CCA procedures. The ECCA procedure 615 may, therefore, have a variable duration. In some examples, the ECCA procedure 615 may be performed in accordance with an LBT-load based equipment (LBT-LBE) protocol (e.g., the LBT-LBE protocol described by EN 301 893). The ECCA procedure 615 may provide a greater likelihood of winning contention to access the contention-based shared radio frequency spectrum band, but at a potential cost of a shorter data transmission. Following the ECCA procedure 615, a channel reserving signal, such as a CUBS 620, may be transmitted, followed by a data transmission. By way of example, the data transmission may have an intended duration 605 of three subframes and an actual duration 610 of two subframes.

As indicated above, FIG. 6 is provided as an example. Other examples are possible and may differ from what was described in connection with FIG. 6.

A device, such as a UE, may have multiple antennas (N) to use for receiving and/or transmitting signals. The device may divide the use and assignment of the antennas to use for particular radio access technologies (RATs), such as LTE, WiFi, etc., for particular carrier frequencies, or both. For example, the device may use a fixed number of antennas for one carrier in CA cases, or it may use a fixed number of antennas for WiFi when the device supports both WiFi and other technologies, such as LTE. In one example, a UE may have four antennas and assign two of the antennas for WiFi communication and two antennas for LTE communications. A device, such as a UE, may also dynamically or semi-statically select a number of antennas for one technology or one carrier (antenna selection). In such dynamic or semi-static schemes, the sharing or selection may be triggered by a particular measurement result, such as CQI, reference signal receive power (RSRP), and the like.

Communications networks, such as LTE, may have frequency division multiplexing (FDM) implementations and time division multiplexing (TDM) implementations. Sharing options in FDM implementations are not truly sharing different antennas, but rather sharing the frequency spectrum received over the antenna. For example, a UE may use a diplexer/switch in order to use all antennas at the same time for different air-interfaces. The diplexer/switch acts as a filter by filtering out the unwanted frequencies. However, in such FDM sharing schemes, there is typically a considerable loss in signal strength as the signals are filtered. Such losses can also increase with the higher frequency bands. TDM implementations may actually use or assign separate antennas for each air-interface/technology. Thus, when communications over such air-interfaces/technologies are not in use, those antennas that were assigned or designated for the unused communications may be shared with other air-interfaces/technologies. The various aspects of the present disclosure are directed to communication systems using TDM implementations.

Figure 7:
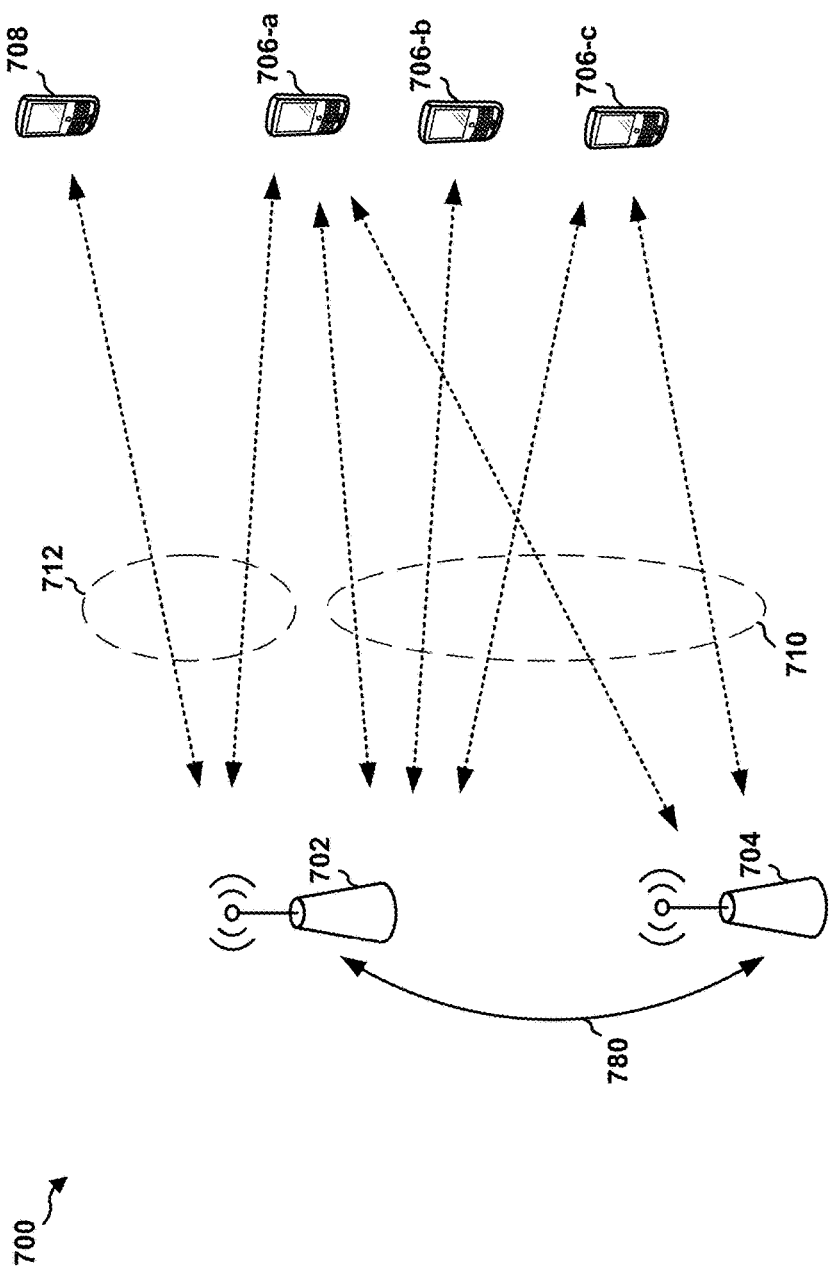
FIG. 7 is a diagram illustrating communication among master devices and slave devices.

FIG. 7 is a diagram 700 illustrating communication among master devices and slave devices. A master device 702 and a master device 704 each are in communication with one or more of slave devices 706-a, 706-b, 706-c and a UE 708 on an unlicensed channel 710 or a channel 712. The master device 702 and master device 704 may be in communication on a backhaul link 780.

Each of the devices shown in FIG. 1 (e.g., the base stations 102 and the UEs 104) may act as a master device or slave device. Some of the devices may operate in a master mode or a slave mode. When the device is operating in the master mode, that device acts as a master device. When the device is operating in the slave mode, that device acts as a slave device. For example, each of the base stations 102 may act as a master device. Each of the UEs 102 may act as a slave device.

The master device may have one or more slave devices associated with the master device. A slave device may be associated with one or more master devices. FIG. 7 shows, as an example, the master device 702 and the slave devices 706-a, 706-b, 706-c are associated with each other in a first association. The master device 704 and the slave devices 706-a, 706-c are associated with each other in a second association. The master device 702, the master device 704, and the slave device 706-a may be associated with each other in a third association. The master device 702 may operate over multiple channels. Further, the master device 702 may operate in-band, out-of-band, or both.

Specifically, the master device 702 (e.g., the base stations 102) may communicate, on the unlicensed channel 710, with the slave devices 706-a, 706-b, 706-c (e.g., the UEs 104). The communication between the master device 702 and the slave devices 706-a, 706-b, 706-c on the unlicensed channel 710 may be considered as an in-band communication of the master device and the associated slave devices. Further, the master device 702 may communicate with the UE 708 on the channel 712. The master device 702 may also communicate with the slave device 706-a on the channel 712. The channel 712 may be either a licensed channel or an unlicensed channel. The communication on the channel 712 is an out-of-band communication with respect to the communication on the unlicensed channel 710. Further, the master device 704 and the slave devices 706-a, 706-c may communicate on the unlicensed channel 710, as well. Further, a master device may control the channel access behavior of each of the associated slave devices. For example, as described infra, the master device 702 may send to the slave devices 706-a, 706-b, 706-c an indication that instructs the slave devices 706-a, 706-b, 706-c to perform an ICCA procedure, an ECCA procedure, or a deferral period to obtain access to the unlicensed channel 710. During the deferral period, slave devices 706-a, 706-b, 706-c may defer performing a CCA procedure. The deferral period may be a function of the type of traffic within the cell. The deferral period may be different for data and control information. Information indicating whether the slave devices 706-a, 706-b, 706-c use ICCA, ECCA, or a deferral period may be communicated by the master device 702 on a common DL control channel (e.g., common PUCCH). In an aspect, the indication may include a common-CRNTI (CCRNTI).

Further, master devices may jointly control the channel access behavior of the slave devices associated with all of the master devices. For example, the master device 702 and the master device 704 may jointly control the channel access behavior of the slave devices 706-a, 706-c. The operation of several master devices (e.g., the master device 702 and the master device 704), including channel access behavior, may be coordinated by a network controller. For example, LBT procedures can be dynamically changed for the slave devices 706-a, 706-b, 706-c at the master device 702.

Further, a slave device may operate over multiple channels. For example, the slave device 706-a operates on the unlicensed channel 710 and the channel 712. A slave device may be associated with more than one master device. For example, the slave devices 706-a, 706-c each are associated with both the master device 702 and the master device 704.

Further, a slave device may support dual connectivity. A slave device (e.g., the slave device 706-a) may operate on a licensed channel (e.g., the channel 712), or an unlicensed channel (e.g., the unlicensed channel 710), or both. For example, the slave device 706-a may communicate concurrently or simultaneously with the master device 702 on the unlicensed channel 710 and the channel 712.

Associated master device and slave devices may support a coordinated multipoint (CoMP) procedure. For example, the slave device 706-c may communicate with the master device 702 and the master device 704 through a CoMP procedure. The master device 702 and the master device 704 communicate on the backhaul link 780 to implement joint scheduling, transmission, reception, etc.

In addition, multiple master devices may control functions of a slave device. For example, in an UL CoMP procedure, the slave device 706-a or the slave device 706-c may receive DL and UL grants from one of the master device 702 and master device 704, and may transmit data on the UL to the other one. The slave device 706-a or the slave device 706-c may receive from the master device 702 or the master device 704 an indication that instructs the slave device 706-a and the slave device 706-c to perform an ICCA procedure or an ECCA procedure to obtain access to the unlicensed channel 710. That is, both the master device 702 and the master device 704 may control the channel access behavior of the slave devices 706-a, 706-c.

Figure 8:
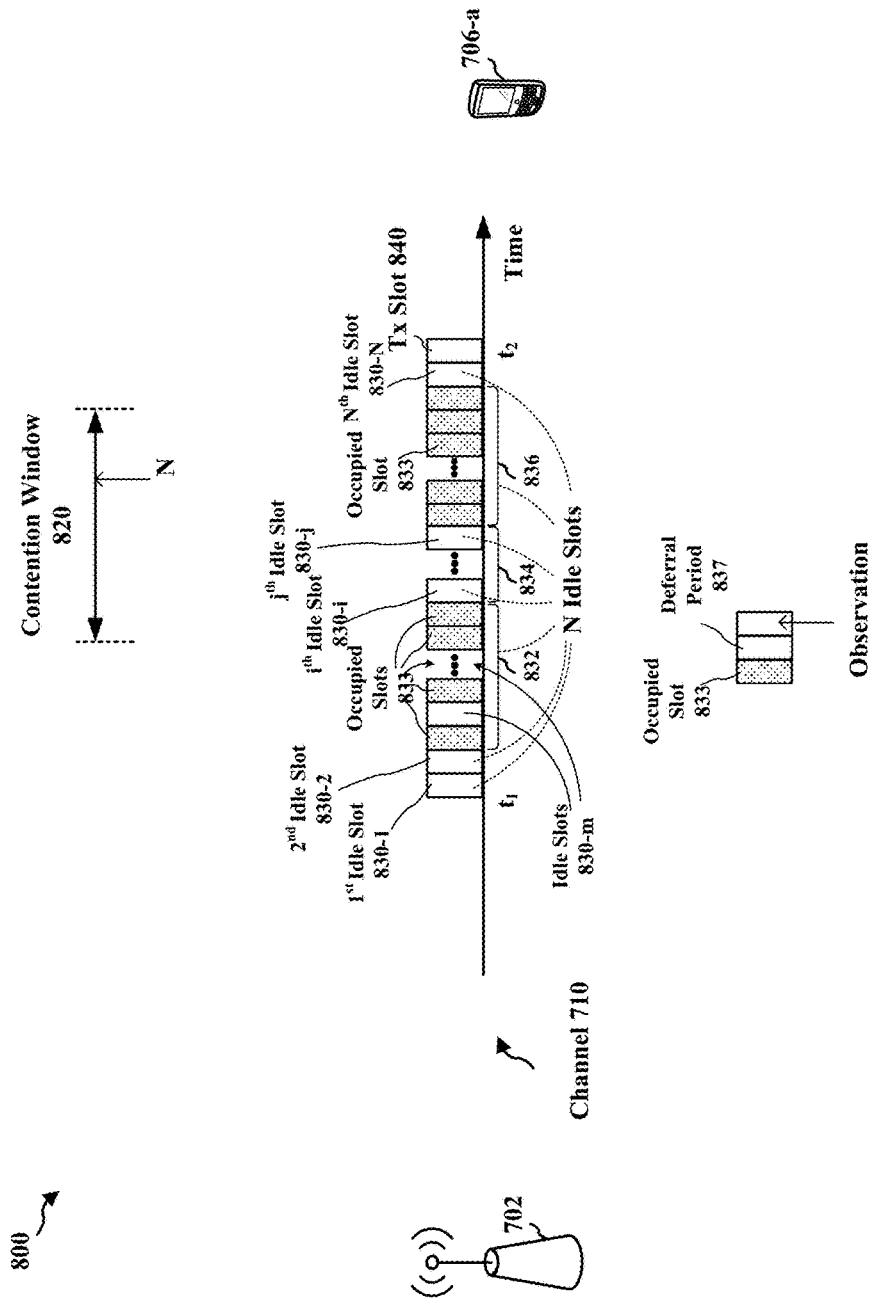
FIG. 8 is a diagram illustrating an ECCA procedure.

FIG. 8 is a diagram 800 illustrating an ECCA procedure. The exemplary master device 702 or the exemplary slave device 706-a may perform the ECCA procedure to obtain a transmission slot 840 (or a transmission opportunity) on the unlicensed channel 710 in order to communicate with each other. Within the ECCA procedure, the master device 702 may observe, based on a contention window 820, first idle observation slot 830-1, second idle observation slot 830-2, observation slots 832 (including idle observation slots 830-m and occupied observation slot 833), an ith idle observation slot 830-i, consecutive idle observation slots 834, a jth idle observation slot 830-j, observation slots 836, and an Nth idle observation slot 830-N.

The master device 702 or the slave device 706-a may determine the length of the contention window 820. Particularly, the contention window 820 may be determined between a maximum contention window size and a minimum contention window size. The master device 702 may determine the maximum contention window size and the minimum contention window size by itself. In addition or alternatively, a network controller, for example, may configure the maximum contention window size and the minimum contention window size used by the master device 702. The slave device 706-a may determine the maximum contention window size and the minimum contention window size by itself autonomously. In addition or alternatively, the master device 702 can configure the maximum contention window size and the minimum contention window size used by the slave device 706-*a*.

The master device 702 may further determine the length of the contention window 820 based on the channel condition of the unlicensed channel 710. The master device 702 may determine the contention window 820 based on a configuration received from a network controller. Particularly, the master device 702 may determine the contention window 820 semi-statically or dynamically by observing the channel condition and feedback response/reports sent by the slave device 706-*a*. For example, the master device 702 may monitor ACKs or negative acknowledgements (NACKs) sent by the slave device 706-*a* for the data transmitted from the master device 702 to the slave device 706-*a*. Based on the ACKs and/or the NACKs, the master device 702 may determine the channel condition of the unlicensed channel 710.

The slave device 706-*a* may also determine the length of the contention window 820 based on the channel condition of the unlicensed channel 710. The slave device 706-*a* may further determine the contention window 820 based on a configuration received from the master device 702. Particularly, the slave device 706-*a* may determine the contention window 820 semi-statically or dynamically by observing the channel condition and feedback response/reports sent by the master device 702. For example, the slave device 706-*a* may monitor the ACKs or NACKs sent by the master device 702 for the data transmitted from the slave device 706-*a* to the master device 702. Based on the ACKs and NACKs, the slave device 706-*a* may determine the channel condition of the unlicensed channel 710.

Upon determining the length of the contention window 820, the master device 702 or the slave device 706-*a* may obtain a number N between 1 and the length of the contention window 820. For example, the master device 702 or the slave device 706-*a* may generate a random number N uniformly distributed between 1 and the length of the contention window 820. The value of N may be selected every time an ECCA is performed and may be stored in a counter.

Subsequently, the master device 702 or the slave device 706-*a* may initiate an ECCA procedure, in which the master device 702 or the slave device 706-*a* observes the unlicensed channel 710 being idle for an observation period of N multiplied by an observation slot. An observation slot is the smallest unit of channel observation time and, for example, may be 20 μs. That is, N defines the number of unoccupied (idle) observation slots in a total idle observation period that needs to be observed before the master device 702 or the slave device 706-*a* determines that the transmission slot 840 is obtained. The counter, whose initial value is N, is decremented every time an observation slot is considered to be unoccupied or idle. The master device 702 or the slave device 706-*a* may consider the unlicensed channel 710 to be occupied if the energy level in the channel exceeds a threshold, which may be configurable at the master device 702 or the slave device 706-*a*. When the counter reaches 0, the master device 702 or the slave device 706-*a* may determine that it has obtained the transmission slot 840 and may transmit data at the transmission slot 840.

Figure 9:
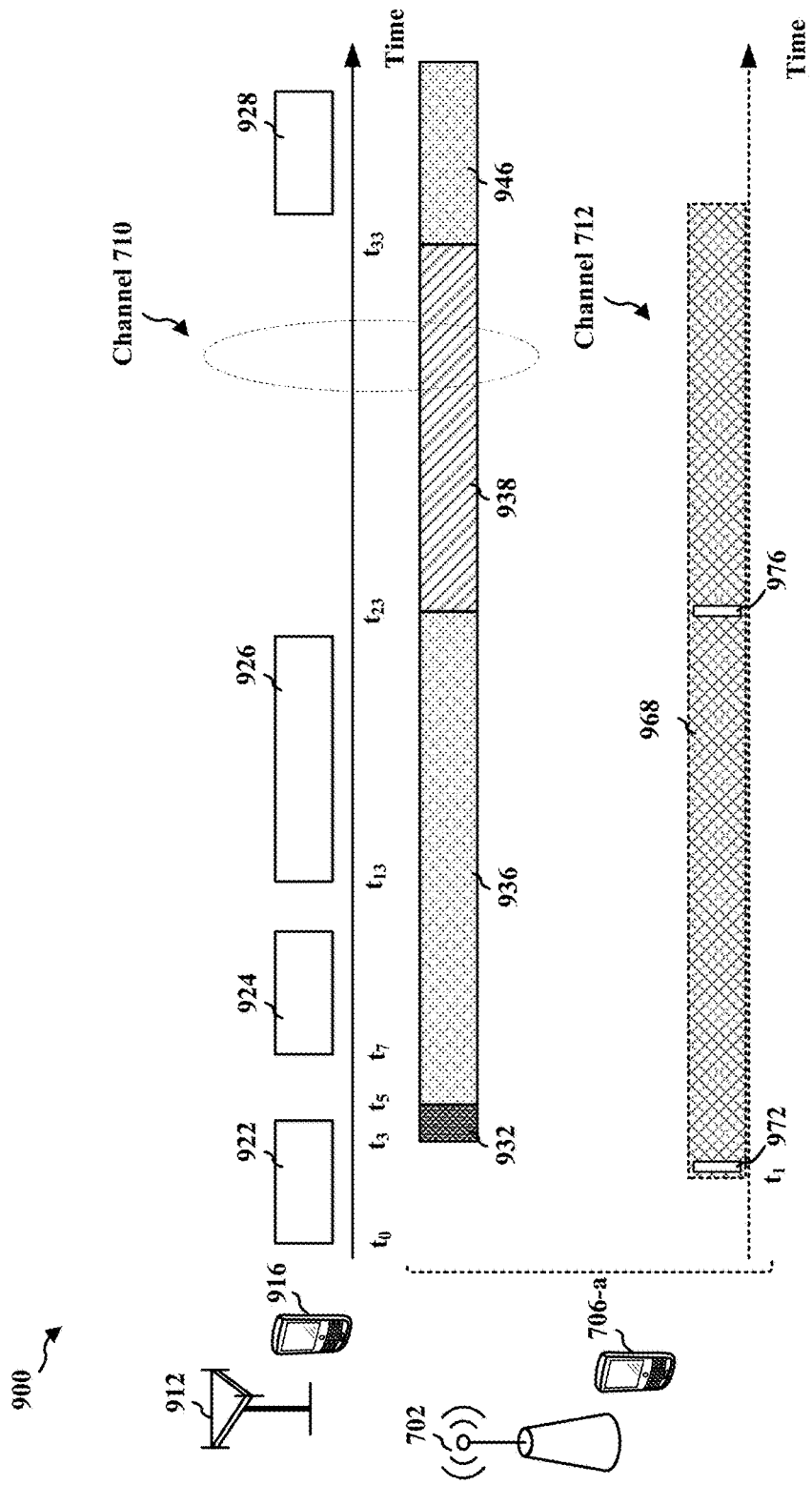
FIG. 9 is a diagram illustrating channel access procedures of a master device and a slave device on an unlicensed channel.
Figure 10:
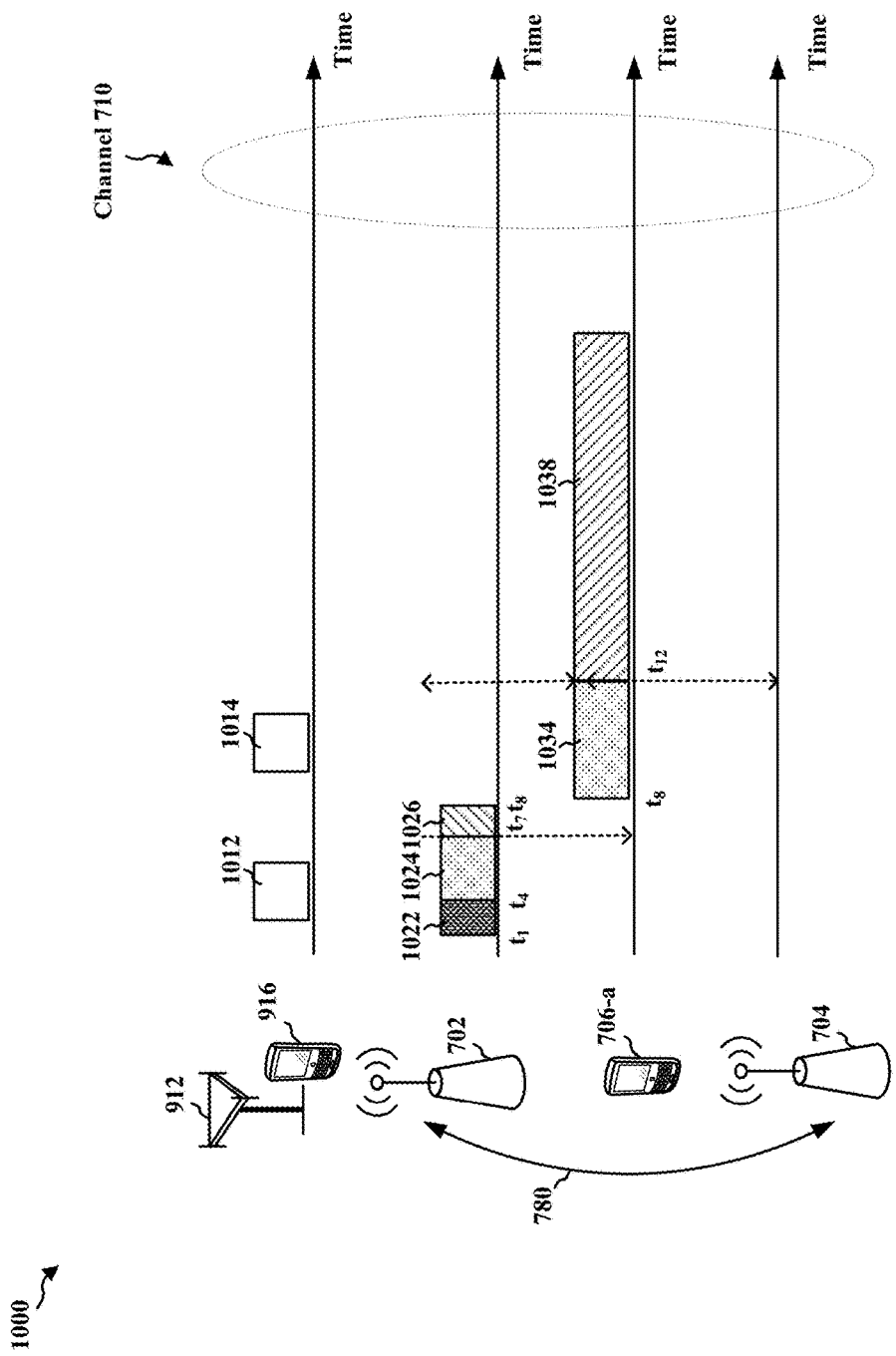
FIG. 10 is a diagram illustrating master devices and a slave device communicate in accordance with a CoMP procedure.
Figure 11:
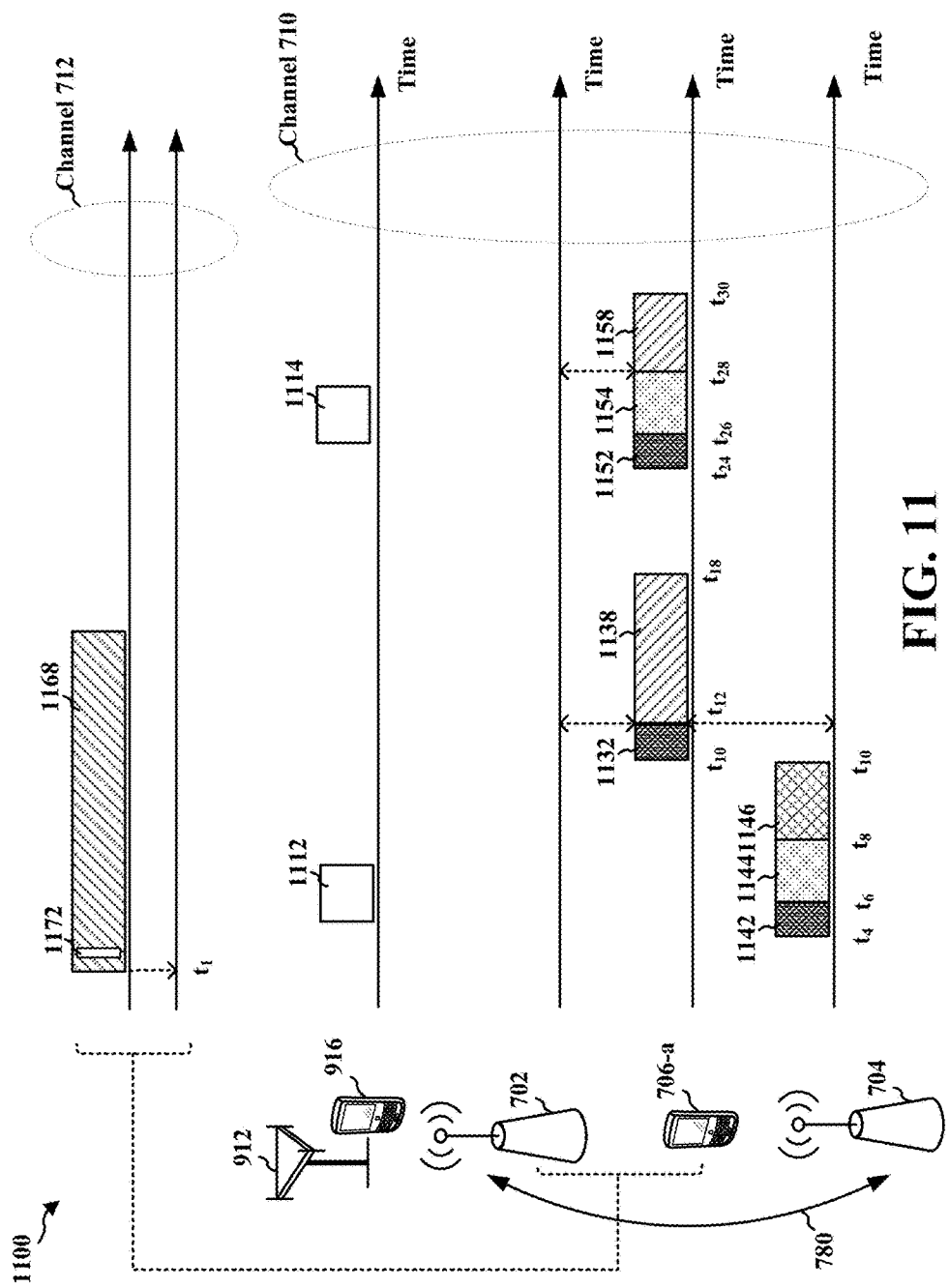
FIG. 11 is another diagram illustrating master devices and a slave device communicate in accordance with a CoMP procedure.

For example, under certain circumstances described infra referring to FIGS. 9-11, the master device 702 or the slave device 706-*a* may perform the ECCA procedure. Specifically, at time point t1, the master device 702 or the slave device 706-*a* may set the counter at N. In this example, after time point t1, the master device 702 or the slave device 706-*a* observes the first idle observation slot 830-1 and the second idle observation slot 830-2, and decrements the counter by 2. That is, the counter is at N−2. Subsequently, the master device 702 or the slave device 706-*a* observes the observation slots 832, which may include one or more occupied observation slots 833 and one or more idle observation slots 830-*m*. Subsequently, the master device 702 or the slave device 706-*a* may observe the consecutive idle observation slots 834, which begins at the ith idle observation slot 830-*i* and ends at the jth idle observation slot 830-*j*. Subsequently, the master device 702 or the slave device 706-*a* observes the observation slots 836, which may include one or more occupied observation slots 833. The master device 702 or the slave device 706-*a* decrements the counter according to the observed idle observation slots during the process. After observing the observation slots 836, the counter is set at 1. Next, the master device 702 or the slave device 706-*a* observes the Nth idle observation slot 830-N, and the counter reaches 0. The master device 702 or the slave device 706-*a*, at time point t2, determines that it has obtained the transmission slot 840 and may start transmitting the data at the transmission slot 840.

In certain configurations, after the master device 702 or the slave device 706-*a* observes each occupied observation slot 833, the master device 702 or the slave device 706-*a* may optionally wait a deferral period 837 before observing the next observation slot. The master device 702 may choose not to configure the deferral period 837 or set the deferral period 837 to zero. If the deferral period 837 is not set to zero, the duration of the deferral period 837 may be the duration of one or more observation slots. The master device 702 may also decide and configure the deferral period 837 used by the slave device 706-*a*.

FIG. 9 is a diagram 900 illustrating channel access procedures of a master device and a slave device on an unlicensed channel. The exemplary master device 702 may perform an ICCA procedure 932, an ECCA procedure 936, and an ECCA procedure 946 to obtain transmission slots on the unlicensed channel 710 in order to communicate with the slave device 706-*a*. The master device 702 and the slave device 706-*a* may communicate subframes 938 on the unlicensed channel 710. In certain configurations, the master device 702 may communicate subframes 968, which may include a resource allocation 972 and a transmission-slot indication 976, with the slave device 706-*a* on the channel 712, which may be a licensed channel or a different unlicensed channel. Further, an AP 912 and a STA 916 may communicate packets 922, 924, 926, 928 on the unlicensed channel 710.

As shown, the master device 702 and the slave device 706-*a* share the unlicensed channel 710 with the AP 912 and the STA 916. In certain configurations, when the master device 702 or the slave device 706-*a* is idle on the unlicensed channel 710, the master device 702 or the slave device 706-*a* is configured to perform an ICCA procedure initially to obtain channel access. In the ICCA procedure, a device (e.g., the master device 702 or the slave device 706-*a*) observes the unlicensed channel 710 for a predetermined time period (e.g., 1, 2, or 5 observation slots) and determines whether the unlicensed channel 710 is idle in the predetermined time period. When the unlicensed channel 710 is determined to be idle in the predetermined time period, the master device 702 or the slave device 706-*a* may start transmission on the unlicensed channel 710 immediately.

In this example, at time point $t_3$, the master device 702 is idle on the unlicensed channel 710. The master device 702 further wants to communicate the subframes 938 with the slave device 706-*a*. Accordingly, under this circumstance, the master device 702 accordingly performs an ICCA procedure. In the ICCA procedure, the master device 702 observes the unlicensed channel 710 for the predetermined time period, i.e., from time point $t_3$ to time point $t_5$, and determines whether the unlicensed channel 710 is idle in the predetermined time period. In this example, at time point $t_0$, the AP 912 and the STA 916 start communicating the packets 922 on the unlicensed channel 710. The transmission period of the packets 922 overlaps with the predetermined time period of the ICCA procedure 932. Thus, the master device 702, in the ICCA procedure 932, determines that the unlicensed channel 710 is occupied.

In certain configurations, upon determining that the unlicensed channel 710 is occupied in the ICCA procedure 932, the master device 702 may subsequently perform the ECCA procedure 936, as described supra, to obtain a transmission slot. Specifically, the master device 702, at time point $t_5$, starts performing the ECCA procedure 936. Subsequently, at time point $t_7$, the AP 912 and the STA 916 start communicating the packets 924. At time point $t_{13}$, the AP 912 and the STA 916 start communicating the packets 926. Thus, in this example, only at time point $t_{23}$, the counter of the ECCA procedure 936 as described supra reaches 0. Accordingly, at time point $t_{23}$, the master device 702 determines that it has obtained a transmission slot and starts communicating the subframes 938 with the slave device 706-*a*. The subframes 938 may be the LBT radio frame 415.

In certain configurations, the transmission time of the subframes 938 may be limited to a maximum channel occupancy duration, which is the maximum time for which a device may transmit continuously on an unlicensed channel. The device needs to perform another ECCA procedure to obtain a transmission slot again after transmitting for the maximum channel occupancy duration. In this example, the maximum channel occupancy duration lasts from time point $t_{23}$ to time point $t_{33}$. Accordingly, at time point $t_{33}$, the master device 702 performs the ECCA procedure 946 to obtain another transmission slot. In this example, the AP 912 and the STA 916 may communicate the packets 928 on the unlicensed channel 710, which overlaps with the time period of the ECCA procedure 946.

In another example, at time point $t_3$, the slave device 706-*a*, instead of the master device 702, may want to transmit data to the other device. The slave device 706-*a* may perform the operations similar to those described supra with respect to the master device 702 (i.e., the ICCA procedure 932, the ECCA procedure 936, etc.) to obtain a transmission slot and then transmit data.

In certain configurations, as described supra, the master device 702 and the slave device 706-*a* may communicate the subframes 968 with each other on the channel 712, concurrently with the communication on the unlicensed channel 710. The channel 712 may be a licensed channel or an unlicensed channel different from the unlicensed channel 710. In this example, the master device 702 and the slave device 706-*a* start the communication on the channel 712 at time point $t_1$. Prior to time point $t_3$, the master device 702 may transmit the resource allocation 972 (e.g., subframe allocation for the LBT radio frame 415) for the unlicensed channel 710 to the slave device 706-*a* in the subframes 968. Upon receiving the resource allocation 972, the slave device 706-*a* may perform an ICCA procedure and an ECCA procedure to obtain a transmission slot. In this example, the slave device 706-*a* performs the ICCA procedure 932 and the ECCA procedure 936 and accordingly obtains a transmission slot at time point $t_{23}$ as described supra. Further, at $t_{23}$, the slave device 706-*a* may send a transmission-slot indication 976 in the subframes 968 on the channel 712 to the master device 702 to indicate a transmission slot has been obtained on the unlicensed channel 710. Upon receiving the transmission-slot indication 976, the master device 702 may start transmitting, on the unlicensed channel 710, the subframes 938 to the slave device 706-*a*.

FIG. 10 is a diagram 1000 illustrating master devices and a slave device communicate in accordance with a CoMP procedure. The exemplary master devices 702, 704 and the exemplary slave device 706-*a* are associated with each other. The master device 702 may perform an ICCA procedure 1022 and an ECCA procedure 1024, and may transmit a resource allocation 1026 to the slave device 706-*a* on the unlicensed channel 710. The slave device 706-*a* may perform an ECCA procedure 1034 and may communicate subframes 1038 with the master device 702 and/or the master device 704.

More specifically, at $t_1$, the master device 702 determines to transmit, on the unlicensed channel 710, a resource allocation for the slave device 706-*a* to communicate with the master device 704 on the unlicensed channel 710 in accordance with a CoMP procedure. In this example, the master device 702 determines that it is idle on the unlicensed channel 710. That is, the master device 702 is not actively transmitting or receiving signal on the unlicensed channel 710. Accordingly, the master device 702 determines to perform an ICCA procedure 1022 to obtain a transmission slot. Otherwise, the master device 702 may determine to perform an ECCA procedure to obtain the transmission slot. In addition or alternatively, the master device 702 may determine that none of the master device 702 and the devices associated with the master device 702, i.e., the master device 704 and the slave device 706-*a*, is active on the unlicensed channel 710 before using the ICCA procedure to obtain the transmission slot. In other words, if any of the master device 702, master device 704, or slave device 706-*a* is active, the master device 702 may determine to perform an ECCA procedure to obtain a transmission slot.

In this example, the master device 702 determines that the unlicensed channel 710 is occupied during the ICCA procedure 1022, as the transmission period of the packets 1012 transmitted between the AP 912 and the STA 916 overlaps with the time period of the ICCA procedure 1022. Subsequently, at time point $t_4$, the master device 702 performs the ECCA procedure 1024 to obtain a transmission slot. Upon obtaining the transmission slot, from $t_7$ to $t_8$, the master device 702 transmits the resource allocation 1026 to the slave device 706-*a* on the unlicensed channel 710. The master device 702 may transmit information regarding the resource allocation 1026 to the master device 704 through the backhaul link 780 such that the master device 704 may communicate with the slave device 706-*a* in accordance with the CoMP procedure.

The resource allocation 1026 may indicate the slave device 706-*a* to transmit data to the master device 704 immediately upon receiving the resource allocation 1026 or at a particular time point. At the transmission time point, the slave device 706-*a* may determine whether any of the slave device 706-*a* and the associated devices (i.e., the master device 702 and the master device 704) is active on the unlicensed channel 710 or was active within a predetermined time period (e.g., 1, 3, or 5 observation slots). When one of the devices is active or was active with the predetermined time period, the slave device 706-*a* may determine to perform the ECCA procedure to obtain access to the unlicensed channel 710. In this example, based on the resource allocation 1026, the slave device 706-a determines to transmit data to the master device 702 immediately after the reception of the resource allocation 1026. The slave device 706-a further determines that the associated master device 702 was active at time point $t_8$, and accordingly performs the ECCA procedure 1034 to obtain a transmission slot on the unlicensed channel 710. The time period of the ECCA procedure 1034 may overlap with the transmission time period of the packets 1014 transmitted between the AP 912 and the STA 916. Through the ECCA procedure 1034, the slave device 706-a obtains a transmission slot at time point $t_{12}$. Accordingly, at time point $t_{12}$, the slave device 706-a communicates the subframes 1038 on the unlicensed channel 710 to the master device 704 in accordance with the resource allocation 1026.

In another configuration, the resource allocation 1026 may be for the slave device 706-a to communicate with the master device 702 on the unlicensed channel 710, as well. Particularly, in this example, the resource allocation 1026 may enable the master devices 702, 704 to use a joint reception procedure of CoMP to receive UL subframes simultaneously and to use a joint transmission procedure to transmit DL subframes to the slave device 706-a simultaneously.

FIG. 11 is another diagram 1100 illustrating master devices and a slave device communicate in accordance with a CoMP procedure. The exemplary master devices 702, 704 and the exemplary slave device 706-a are associated with each other. The master device 702 may communicate subframes 1168, which includes a resource allocation 1172, with the slave device 706-a on the channel 712. The channel 712 may be either a licensed channel or an unlicensed channel. The master device 704 may, on the unlicensed channel 710, perform an ICCA procedure 1142 and an ECCA procedure 1144, and may transmit signals 1146. The slave device 706-a may perform an ICCA procedure 1132, an ICCA procedure 1152, and an ECCA procedure 1154 on the unlicensed channel 710. The slave device 706-a may communicate subframes 1138 and subframes 1158 with the master devices 702, 704 on the unlicensed channel 710 in accordance with a CoMP procedure.

In one aspect, the channel 712 is a licensed channel. More specifically, at time point $t_1$, the master device 702 communicates the subframes 1168 on the licensed channel 712 with the slave device 706-a. The subframes 1168 includes the resource allocation 1172 for the slave device 706-a to communicate with the master device 704 on the unlicensed channel 710 in accordance with the CoMP procedure. The master device 702 may transmit information regarding the resource allocation 1172 to the master device 704 through the backhaul link 780 such that the master device 704 may communicate with the slave device 706-a in accordance with the CoMP procedure. The information may include an indication that instructs the master device 704 to reserve the unlicensed channel 710 prior to, and for use of, the data communication between the master device 704 and the slave device 706-a in accordance with the resource allocation 1172. As the master device 704 will reserve the unlicensed channel 710, the resource allocation 1172 may also include an indication that instructs the slave device 706-a to perform an ICCA procedure to obtain access to the unlicensed channel 710.

Upon receiving the information regarding the resource allocation 1172 and determining accordingly the expected time point to receive UL transmission from the slave device 706-a on the unlicensed channel 710, the master device 704 may reserve the unlicensed channel 710 for the expected communication in accordance with the resource allocation 1172. Specifically, in this example, the master device 704, at time point $t_4$, determines that it is idle on the unlicensed channel 710. Accordingly, the master device 704 determines to perform the ICCA procedure 1142 to procedure to obtain a transmission slot. Otherwise, the master device 704 may determine to perform an ECCA procedure to obtain the transmission slot. In addition or alternatively, the master device 704 may determine whether any of the master device 704 and the devices associated with the master device 704, i.e., the master device 702 and the slave device 706-a, is active on the unlicensed channel 710 before using the ICCA procedure to obtain the transmission slot. If any of the master device 702, master device 704, or slave device 706-a is active, the master device 704 may determine to perform an ECCA procedure to obtain a transmission slot.

In this example, the master device 704 determines that the unlicensed channel 710 is occupied during the ICCA procedure 1142, as the transmission period of the packets 1112 transmitted between the AP 912 and the STA 916 overlaps with the time period of the ICCA procedure 1142. Subsequently, at time point $t_6$, the master device 702 performs the ECCA procedure 1144 to obtain a transmission slot. Upon obtaining the transmission slot, from time point $t_8$, the master device 702 may transmit the signals 1146 on the unlicensed channel 710 to occupy the channel until the expected UL transmission time (i.e., time point $t_{10}$) for the slave device 706-a to transmit in accordance with the resource allocation 1172.

The slave device 706-a receives the resource allocation 1172 from the subframes 1168 transmitted on the licensed channel 712 from the master device 702. The slave device 706-a also determines that the resource allocation 1172 includes an indication to perform an ICCA procedure to obtain channel access. Accordingly, based on the resource allocation 1172, the slave device 706-a determines to perform the ICCA procedure 1132 to obtain channel access at time point $t_{10}$. Upon obtaining a transmission slot through the ICCA procedure 1132, at time point $t_{12}$, the slave device 706-a transmits subframes 1138 on the unlicensed channel 710 to the master device 704 in accordance with the resource allocation 1172.

In certain configurations, the master device 702 may further determine whether to include the indication of the ICCA procedure in the resource allocation 1172 the master device 702 based on the total channel occupation time (i.e., from time point $t_4$ to time point $t_{18}$) of the master device 704 and the associated devices (i.e., slave device 706-a) on the unlicensed channel 710. The master device 702 may determine or estimate the length of the channel occupation time. If the length is no greater than a preconfigured maximum channel occupancy duration (e.g., 10 ms), the master device 702 may determine to include the indication of the ICCA procedure in the resource allocation 1172. If the length is greater than the maximum channel occupancy duration, the master device 702 may determine to include the indication of the ECCA procedure in the resource allocation 1172. Accordingly, instead of performing the ICCA procedure 1132, the slave device 706-a may perform the ECCA procedure to obtain the transmission slot.

In certain configurations, the resource allocation 1172 may be for the slave device 706-a to communicate with the master device 702 on the unlicensed channel 710, as well. Particularly, in this example, the resource allocation 1172 may enable the master devices 702, 704 to use a joint reception procedure of CoMP to receive UL subframes simultaneously and to use a joint transmission procedure to transmit DL subframes to the slave device 706-a simultaneously.

In certain configurations, the resource allocation 1172 may also be for coordinated scheduling of the slave device 706-a to communicate with the master device 702 (or another master device) subsequent to the communication of the subframes 1138. The master device 702 may not reserve (or instruct the another master device to reserve) the unlicensed channel 710 for this communication. Thus, the master device 702 does not include in the resource allocation 1172 an indication that instructs the slave device 706-a to perform the ICCA procedure or the ECCA procedure to obtain a transmission slot for this subsequent communication. Based on the resource allocation 1172, the slave device 706-a may determine to obtain access to the unlicensed channel 710 at time point $t_{24}$. Particularly, the slave device 706-a may determine whether any of the slave device 706-a and the devices associated with the slave device 706-a, i.e., the master device 702 and the master device 704, is active or was active within the predetermined time period on the unlicensed channel 710. If any of the master device 702, master device 704, or slave device 706-a is active, the master device 704 may determine to perform an ECCA procedure to obtain a transmission slot. In this example, the slave device 706-a determines that the unlicensed channel 710 is occupied during the ICCA procedure 1152, as the transmission period of the packets 1114 transmitted between the AP 912 and the STA 916 overlaps with the time period of the ICCA procedure 1152. Subsequently, at time point $t_{26}$, the slave device 706-a performs the ECCA procedure 1154 to obtain a transmission slot. Upon obtaining the transmission slot, the master device 702 may, at time point $t_{28}$, transmit the subframes 1158 on the unlicensed channel 710 to the master device 702 (or the another master device).

In another aspect, the channel 712 is an unlicensed channel that is different from the unlicensed channel 710. The slave device 706-a may determine the type of the CCA procedure to be used on the unlicensed channel 710 based on whether the resource allocation for the unlicensed channel 710 is transmitted to the slave device 706-a on the unlicensed channel 710 (i.e., the same unlicensed carrier) or on the unlicensed channel 712 (i.e., a different unlicensed carrier). For example, as described supra, when the resource allocation 1026 is transmitted on the unlicensed channel 710, the slave device 706-a may determine to perform the ECCA procedure 1034 to obtain access to the unlicensed channel 710. When the resource allocation 1172 for the unlicensed channel 710 is transmitted on the unlicensed channel 712, similarly to what was described supra with respect to the licensed channel, the slave device 706-a may determine to perform the ICCA, simple CCA, or the ECCA procedure based on prior configuration information, an indication in the resource allocation 1172, or based on transmission activity by the slave device 706-a or the master device 702 on the unlicensed channel 712.

Figure 12:
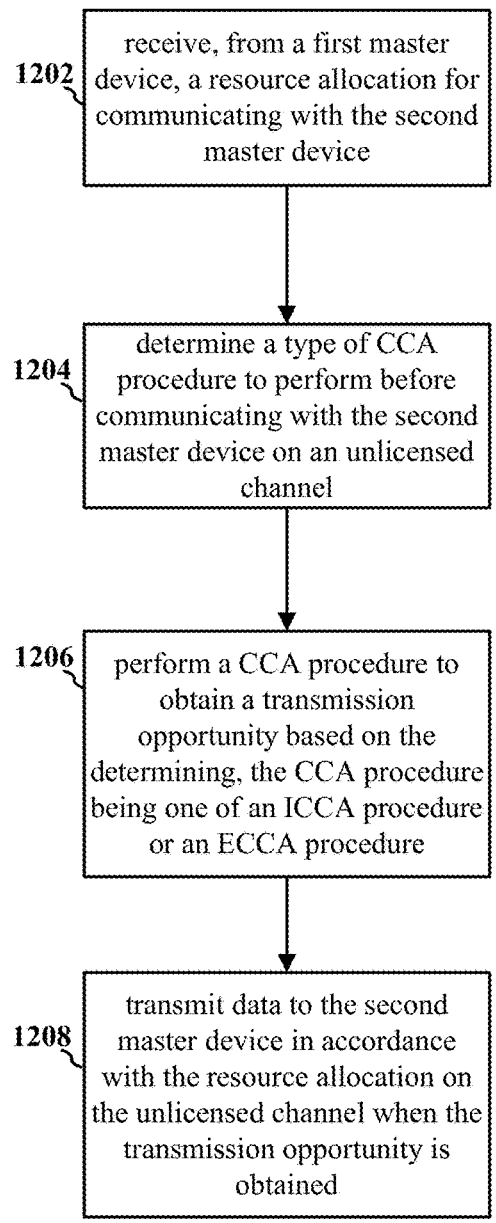
FIG. 12 is a flowchart of a method of wireless communication.

FIG. 12 is a flow chart 1200 of a method (process) of operating a slave device (e.g., the slave devices 706-a, 706-b, 706-c, the apparatus 1402/1402'). The slave device may be associated with the first master device and a second master device.

At 1202, the slave device may receive, from a first master device, a resource allocation for communicating with the second master device. For example, referring to FIG. 11, the master device 702 may communicate subframes 1168, which includes a resource allocation 1172, with the slave device 706-a on the channel 712. The channel 712 may be either a licensed channel or an unlicensed channel.

At 1204, the slave device may determine a type of CCA procedure to perform before communicating with the second master device on an unlicensed channel. For example, referring to FIG. 11, the slave device 706-a may determine the type of the CCA procedure to be used on the unlicensed channel 710 based on whether the resource allocation for the unlicensed channel 710 is transmitted to the slave device 706-a on the unlicensed channel 710 (i.e., the same unlicensed carrier) or on the unlicensed channel 712 (i.e., a different unlicensed carrier). For example, as described supra, when the resource allocation 1026 is transmitted on the unlicensed channel 710, the slave device 706-a may determine to perform the ECCA procedure 1034 to obtain access to the unlicensed channel 710. When the resource allocation 1172 for the unlicensed channel 710 is transmitted on the unlicensed channel 712, similarly to what was described supra with respect to the licensed channel, the slave device 706-a may determine to perform the ICCA, simple CCA, or the ECCA procedure based on prior configuration information, an indication in the resource allocation 1172, or based on transmission activity by the slave device 706-a or the master device 702 on the unlicensed channel 712.

At 1206, the slave device may perform a CCA procedure to obtain a transmission opportunity based on the determined type of CCA procedure. The CCA procedure may be one of an ICCA procedure or an ECCA procedure. For example, referring to FIG. 11, as described supra, when the resource allocation 1026 is transmitted on the unlicensed channel 710, the slave device 706-a may determine to perform the ECCA procedure 1034 to obtain access to the unlicensed channel 710. When the resource allocation 1172 for the unlicensed channel 710 is transmitted on the unlicensed channel 712, similarly to what was described supra with respect to the licensed channel, the slave device 706-a may determine to perform the ICCA, simple CCA, or the ECCA procedure based on prior configuration information, an indication in the resource allocation 1172, or based on transmission activity by the slave device 706-a or the master device 702 on the unlicensed channel 712.

At 1208, the slave device may transmit data to the second master device in accordance with the resource allocation on the unlicensed channel when the transmission opportunity is obtained. For example, referring to FIG. 10, the resource allocation 1026 may indicate to the slave device 706-a to transmit data to the master device 704 immediately upon receiving the resource allocation 1026 or at a particular time point. At the transmission time point, the slave device 706-a may determine whether any of the slave device 706-a and the associated devices (i.e., the master device 702 and the master device 704) is active on the unlicensed channel 710 or was active within a predetermined time period (e.g., 1, 3, or 5 observation slots). When one of the devices is active or was active with the predetermined time period, the slave device 706-a may determine to perform the ECCA procedure to obtain access to the unlicensed channel 710. In this example, based on the resource allocation 1026, the slave device 706-a determines to transmit data to the master device 702 immediately after the reception of the resource allocation 1026. The slave device 706-a further determines that the associated master device 702 was active at time point $t_8$, and accordingly performs the ECCA procedure 1034 to obtain a transmission slot on the unlicensed channel 710. The time period of the ECCA procedure 1034 may overlap with the transmission time period of the packets 1014 transmitted between the AP 912 and the STA 916. Through the ECCA procedure 1034, the slave device 706-a obtains a transmission slot at time point $t_{12}$. Accordingly, at time point $t_{12}$, the slave device 706-a communicates the subframes 1038 on the unlicensed channel 710 to the master device 704 in accordance with the resource allocation 1026.

Figure 13:
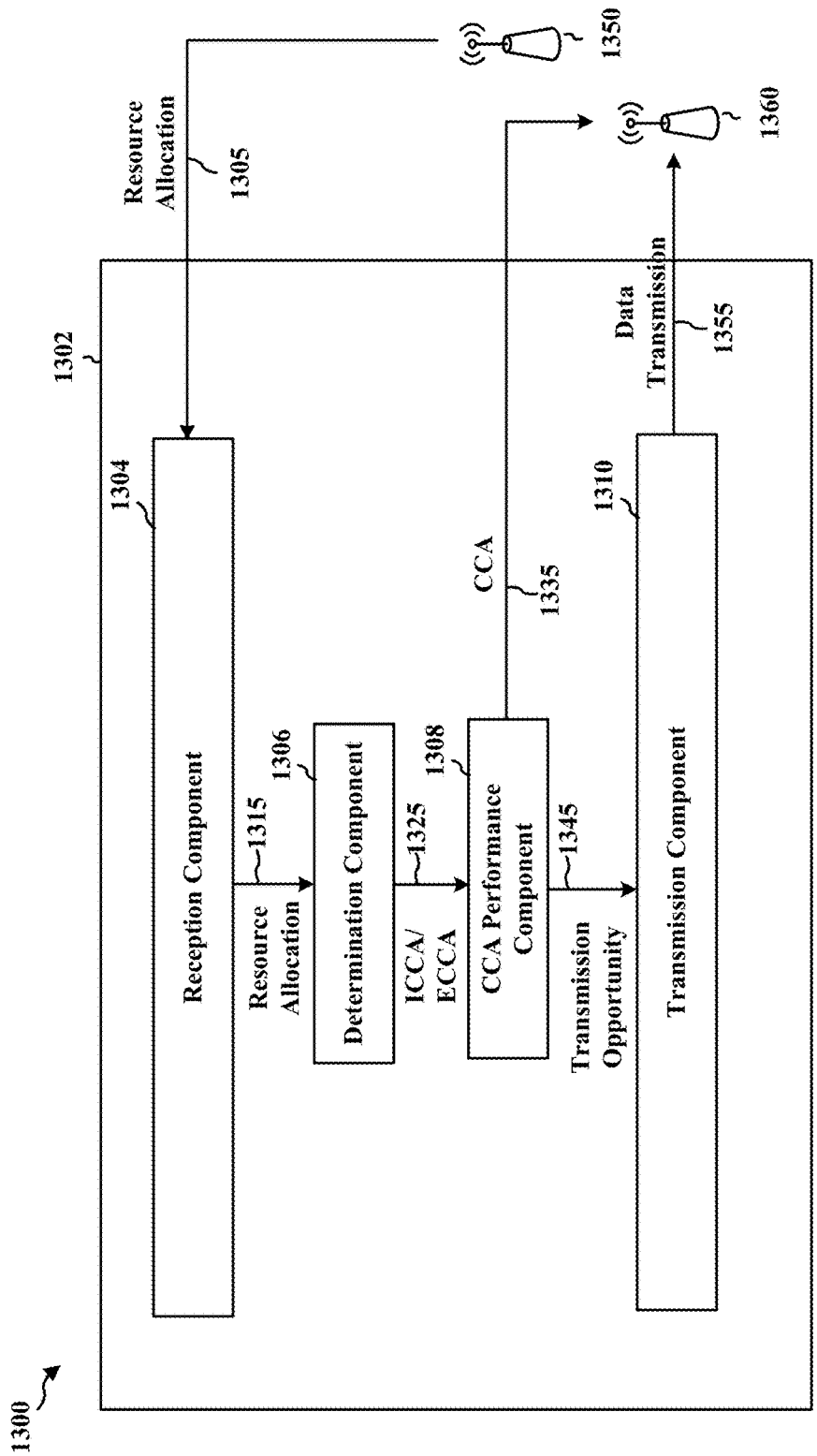
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE. The apparatus includes a reception component 1304 that receives a resource allocation 1305 from a first master device 1350. The apparatus also includes a determination component 1306 that determines a type of CCA procedure (e.g., ICCA or ECCA) to perform before communicating with the second master device on an unlicensed channel based on information associated with the resource allocation 1315 received from the reception component 1304. The apparatus further includes a CCA performance component 1308 that performs a CCA procedure 1335 to obtain a transmission opportunity based on information received from the determination component 1306. The apparatus additionally includes a transmission component 1310 that transmits data 1355 to a second master device 1360 using the transmission opportunity 1345.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
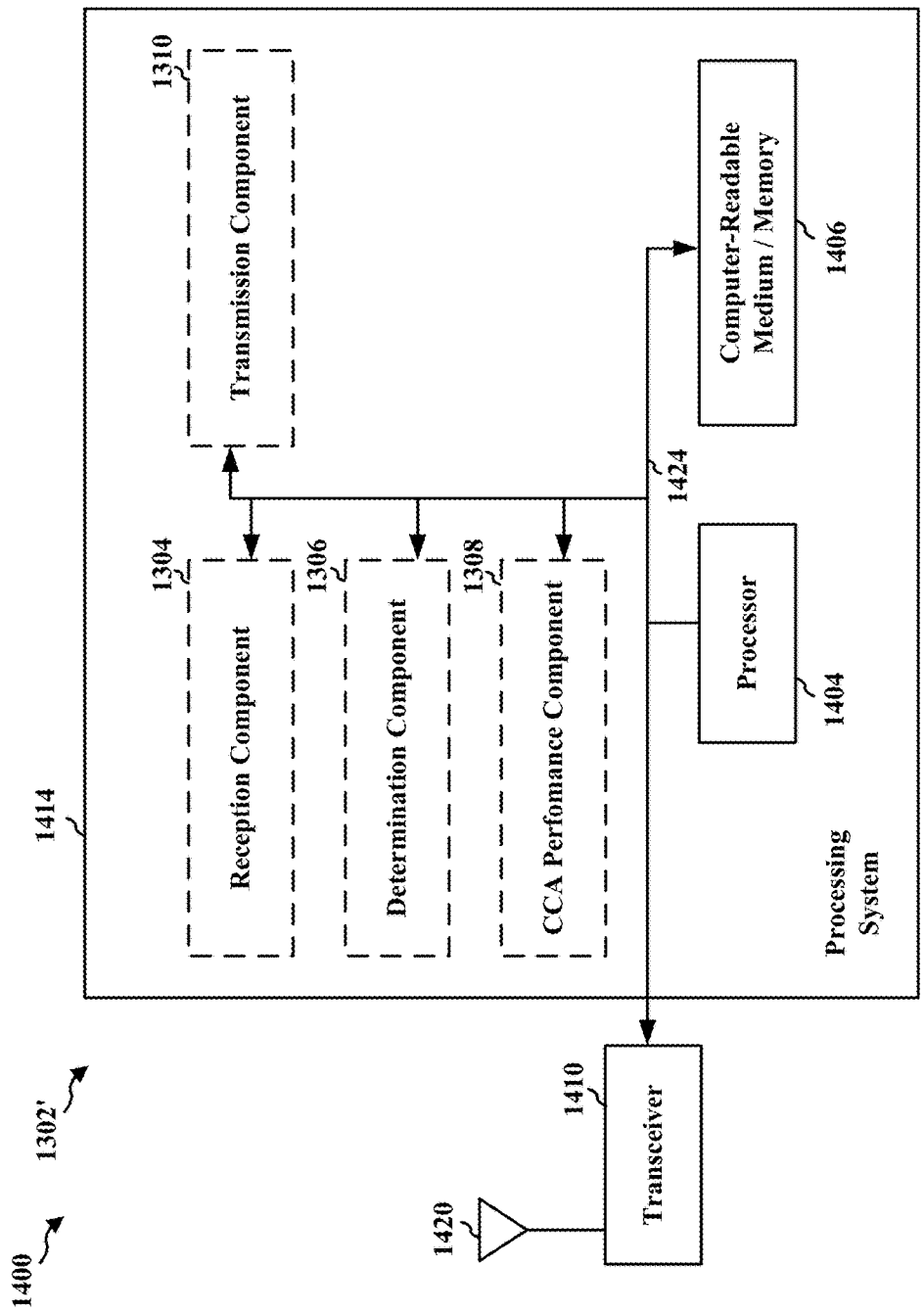
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication includes means for receiving, from the first master device, a resource allocation for communicating with the second master device. In an aspect, the resource allocation is received on at least one of the unlicensed channel or a licensed channel. In another configuration, the apparatus 1302/1302' for wireless communication includes means for determining a type of CCA procedure to perform before communicating with the second master device on an unlicensed channel. In an aspect, the means for determining is configured to determine the type of CCA procedure to perform based on at least one of an indicator included in the resource allocation, configuration information provided by the first master device prior to receiving the resource allocation, whether the first master device or the second master device reserved the unlicensed channel for the transmitting by the slave device, whether the resource allocation was received on the unlicensed channel or another channel, or whether the resource allocation was received on the unlicensed channel or a licensed channel. For example, the another channel may include a different unlicensed channel, a same unlicensed channel, or a licensed channel. In a further configuration, the apparatus 1302/1302' for wireless communication includes means for performing a CCA procedure to obtain a transmission opportunity based on the determining, the CCA procedure being one of an ICCA procedure or an ECCA procedure. In yet another configuration, the apparatus 1302/1302' for wireless communication includes means for transmitting data to the second master device in accordance with the resource allocation on the unlicensed channel when the transmission opportunity is obtained. In one aspect, the resource allocation is further for communicating with the first master device. In a further aspect, the means for transmitting is configured to transmit the data to the first master device in accordance with the resource allocation. In another aspect, the means for transmitting is configured to transmit other data to the first master device in accordance with the resource allocation. For example, the other data may include control data and/or user data. In yet another aspect, the slave device is a user equipment. In a further aspect, the first master device includes a first macro eNB, a first RRH, or a first femto cell. In a further aspect, the second master device includes one of a second eNB, a second RRH, or a second femto cell. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Figure 15:
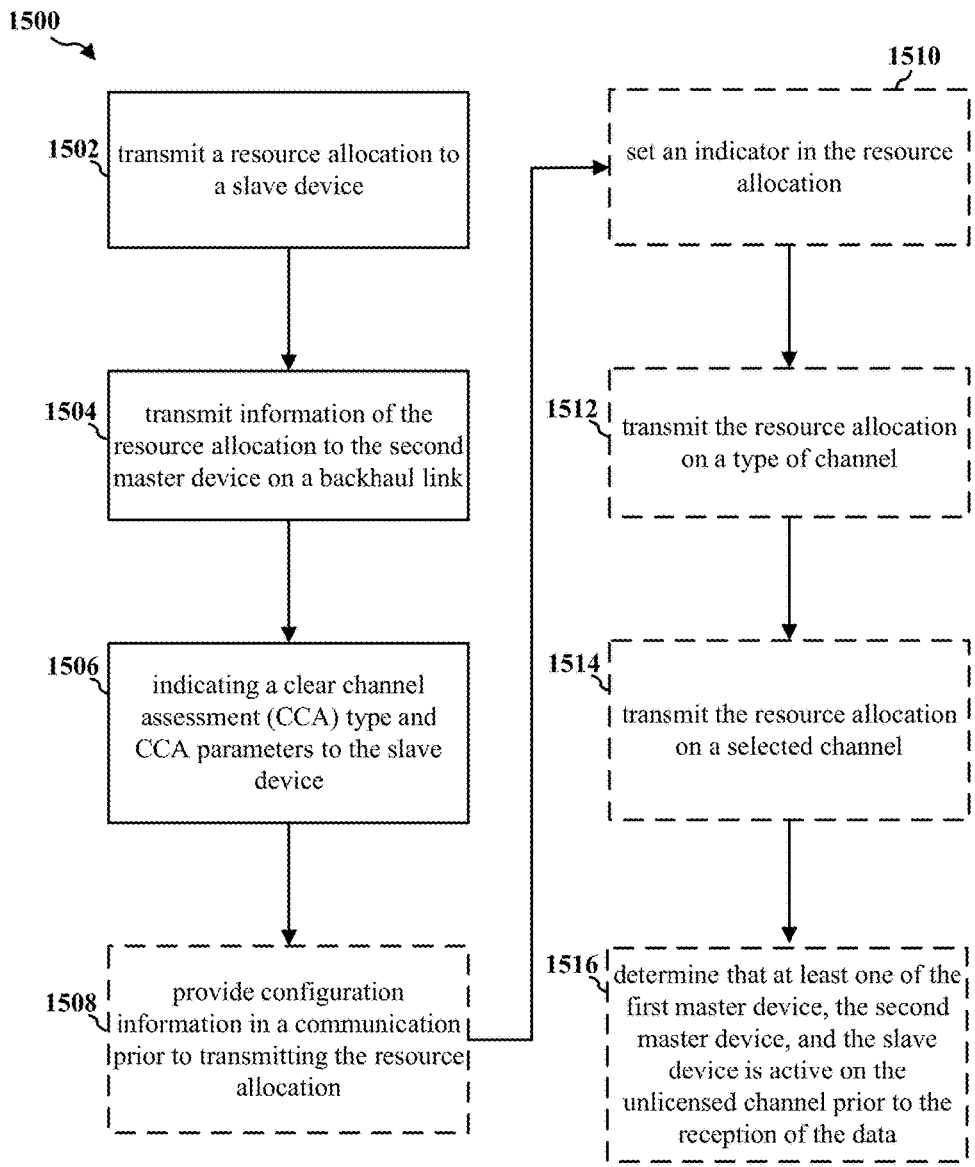
FIG. 15 is a flowchart of a method of wireless communication.

FIG. 15 is a flowchart 1500 of a method of wireless communication. The method may be performed by an eNB (e.g., the master device 702, the apparatus 1502/1502'). It should be understood that the operations indicated with dashed lines represent optional operations for various aspects of the disclosure.

At 1502, the eNB may transmit a resource allocation to a slave device. For example, referring to FIG. 11, The master device 702 may communicate subframes 1168, which includes a resource allocation 1172, with the slave device 706-*a* on the channel 712. The channel 712 may be either a licensed channel or an unlicensed channel.

At 1504, the eNB may transmit information of the resource allocation to the second master device on a backhaul link. For example, referring to FIG. 11, the master device 702 may transmit information regarding the resource allocation 1172 to the master device 704 through the backhaul link 780 such that the master device 704 may communicate with the slave device 706-*a* in accordance with the CoMP procedure. The information may include an indication that instructs the master device 704 to reserve the unlicensed channel 710 prior to, and for use of, the data communication between the master device 704 and the slave device 706-*a* in accordance with the resource allocation 1172. As the master device 704 will reserve the unlicensed channel 710, the resource allocation 1172 may also include an indication that instructs the slave device 706-*a* to perform an ICCA procedure to obtain access to the unlicensed channel 710.

At 1506, the eNB may indicate a CCA type and CCA parameters to the slave device. For example, FIG. 11, the slave device 706-*a* may perform an ICCA procedure 1132, an ICCA procedure 1152, and an ECCA procedure 1154 on the unlicensed channel 710. The eNB may also indicate other configuration parameters, such as the deferral period, ECA counter value, etc.

At 1508, the eNB may provide configuration information in a communication prior to transmitting the resource allocation. For example, referring to FIG. 11, when the resource allocation 1172 for the unlicensed channel 710 is transmitted on the unlicensed channel 712, similarly to what was described supra with respect to the licensed channel, the slave device 706-*a* may determine to perform the ICCA, simple CCA, or the ECCA procedure based on prior configuration information, an indication in the resource allocation 1172, or based on transmission activity by the slave device 706-*a* or the master device 702 on the unlicensed channel 712.

At 1510, the eNB may set an indicator in the resource allocation. For example, referring to FIG. 11, when the resource allocation 1172 for the unlicensed channel 710 is transmitted on the unlicensed channel 712, similarly to what was described supra with respect to the licensed channel, the slave device 706-*a* may determine to perform the ICCA, simple CCA, or the ECCA procedure based on prior configuration information, an indication in the resource allocation 1172, or based on transmission activity by the slave device 706-*a* or the master device 702 on the unlicensed channel 712. the master device 702 may further determine whether to include the indication of the ICCA procedure in the resource allocation 1172 the master device 702 based on the total channel occupation time (i.e., from time point $t_4$ to time point $t_{18}$) of the master device 704 and the associated devices (i.e., slave device 706-*a*) on the unlicensed channel 710. The master device 702 may determine or estimate the length of the channel occupation time. If the length is no greater than a preconfigured maximum channel occupancy duration (e.g., 10 ms), the master device 702 may determine to include the indication of the ICCA procedure in the resource allocation 1172. If the length is greater than the maximum channel occupancy duration, the master device 702 may determine to include the indication of the ECCA procedure in the resource allocation 1172. Accordingly, instead of performing the ICCA procedure 1132, the slave device 706-*a* may perform the ECCA procedure to obtain the transmission slot.

At 1512, the eNB may transmit the resource allocation on a type of channel. For example, referring to FIG. 11, the master device 702 may communicate subframes 1168, which includes a resource allocation 1172, with the slave device 706-*a* on the channel 712. The channel 712 may be either a licensed channel or an unlicensed channel.

At 1514, the eNB may transmit the resource allocation on a selected channel. For example, referring to FIG. 11, the master device 702 may communicate subframes 1168, which includes a resource allocation 1172, with the slave device 706-*a* on the channel 712. The channel 712 may be either a licensed channel or an unlicensed channel.

At 1516, the eNB may determine that at least one of the first master device, the second master device, and the slave device is active on the unlicensed channel prior to the reception of the data. For example, referring to FIG. 11, the master device 702 may determine that none of the master device 702 and the devices associated with the master device 702, i.e., the master device 704 and the slave device 706-*a*, is active on the unlicensed channel 710 before using the ICCA procedure to obtain the transmission slot. In other words, if any of the master device 702, master device 704, or slave device 706-*a* is active, the master device 702 may determine to perform an ECCA procedure to obtain a transmission slot.

Figure 16:
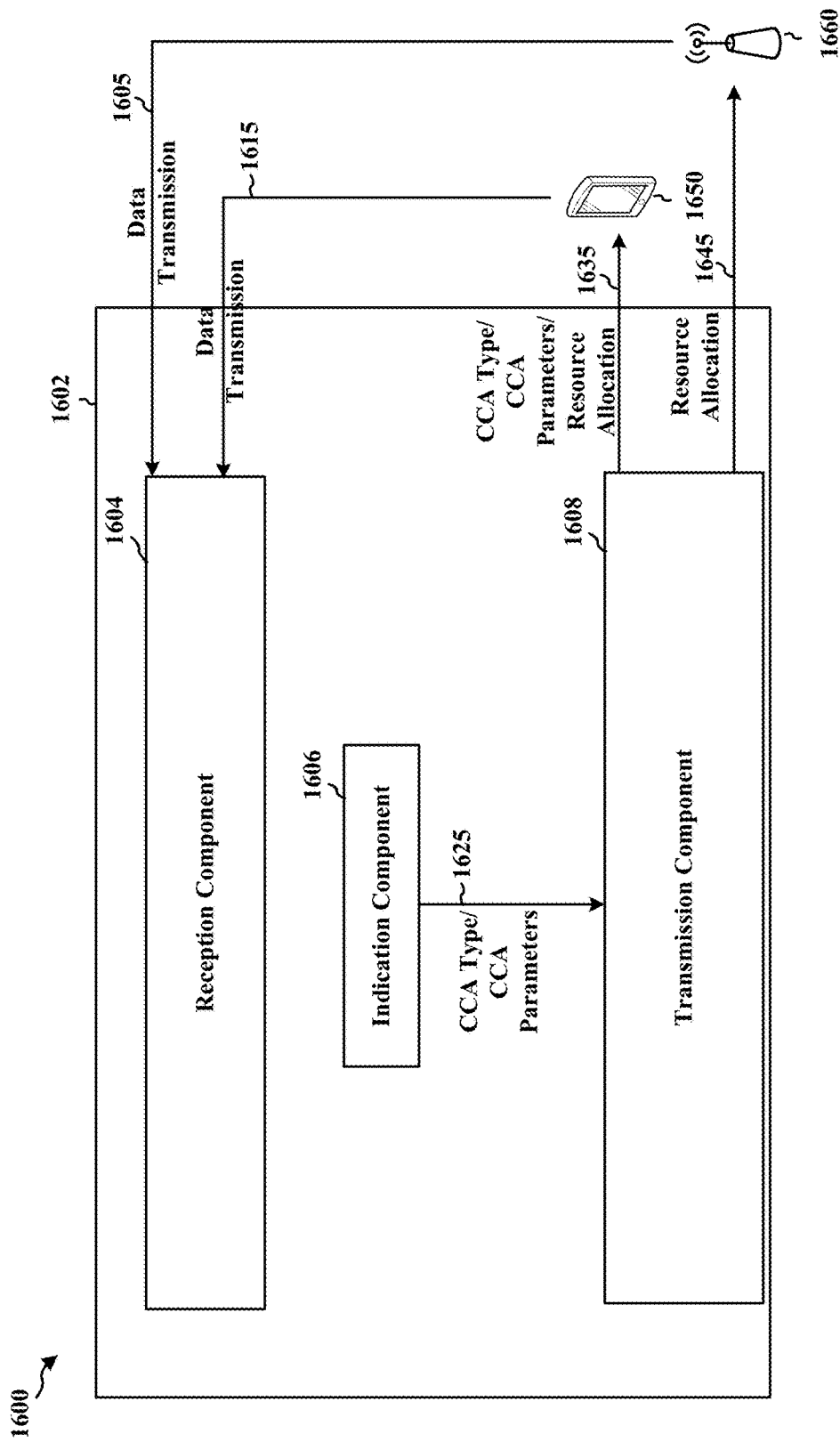
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a eNB. The apparatus includes a reception component 1604 that receives data transmission 1605, 1615 from a slave device 1650 and a master eNB 1660. In addition, the apparatus includes an indication component 1606 that indicates a CCA type and CCA parameters 1625 to the slave device 1650. The apparatus further includes a transmission component 1608 that transmits the CCA type, CCA parameters, and resource allocation 1635 to the slave device 1650. In addition, the transmission component 1608 transmits information 1645 related to the resource allocation to master device 1660.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
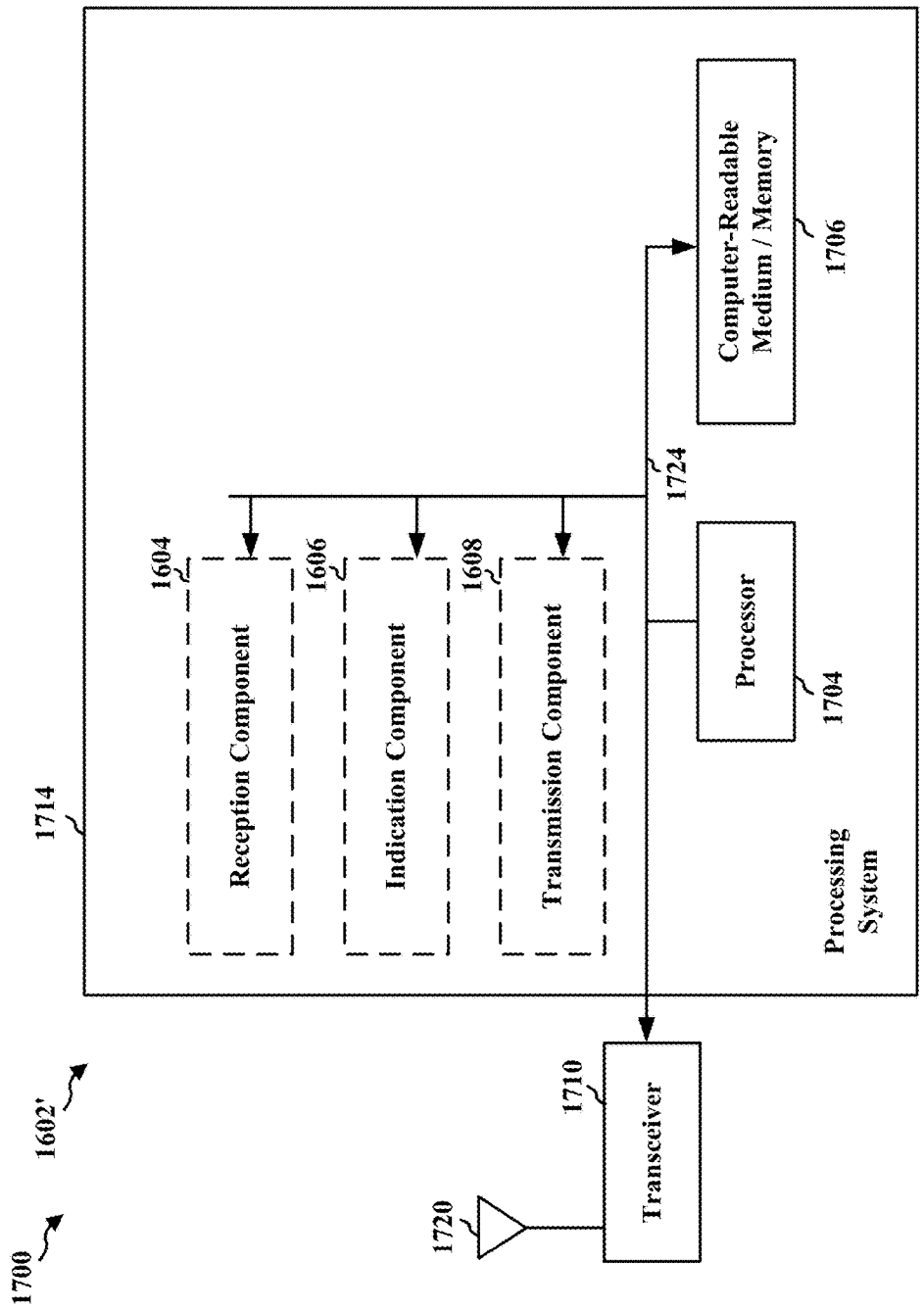
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608. The components may be software components running in the processor 1704, resident/stored in the computer readable medium/memory 1706, one or more hardware components coupled to the processor 1704, or some combination thereof. The processing system 1714 may be a component of the eNB 310 and may include the memory 376 and/or at least one of the TX processor 316, the RX processor 370, and the controller/processor 375.

In one configuration, the apparatus 1602/1602' for wireless communication includes means for transmitting a resource allocation to a slave device for communicating with the second master device. In another configuration, the apparatus 1602/1602' for wireless communication includes means for transmitting information of the resource allocation to the second master device on a backhaul link. In a further configuration, the apparatus 1602/1602' for wireless communication includes means for indicating a CCA type and CCA parameters to the slave device. In an aspect, the means for indicating is configured to provide configuration information in a communication prior to transmitting the resource allocation. In another aspect, the means for indicating is configured to set an indicator in the resource allocation. In a further aspect, the means for indicating is configured to transmit the resource allocation on a type of channel. In yet another aspect, the means for indicating is configured to transmit the resource allocation on a selected channel. In one aspect, the slave device is a user equipment. In a further aspect, the first master device includes a first macro eNB, a first radio RRH, or a first femto cell. In another aspect, the second master device includes one of a second eNB, a second RRH, or a second femto cell.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 18:
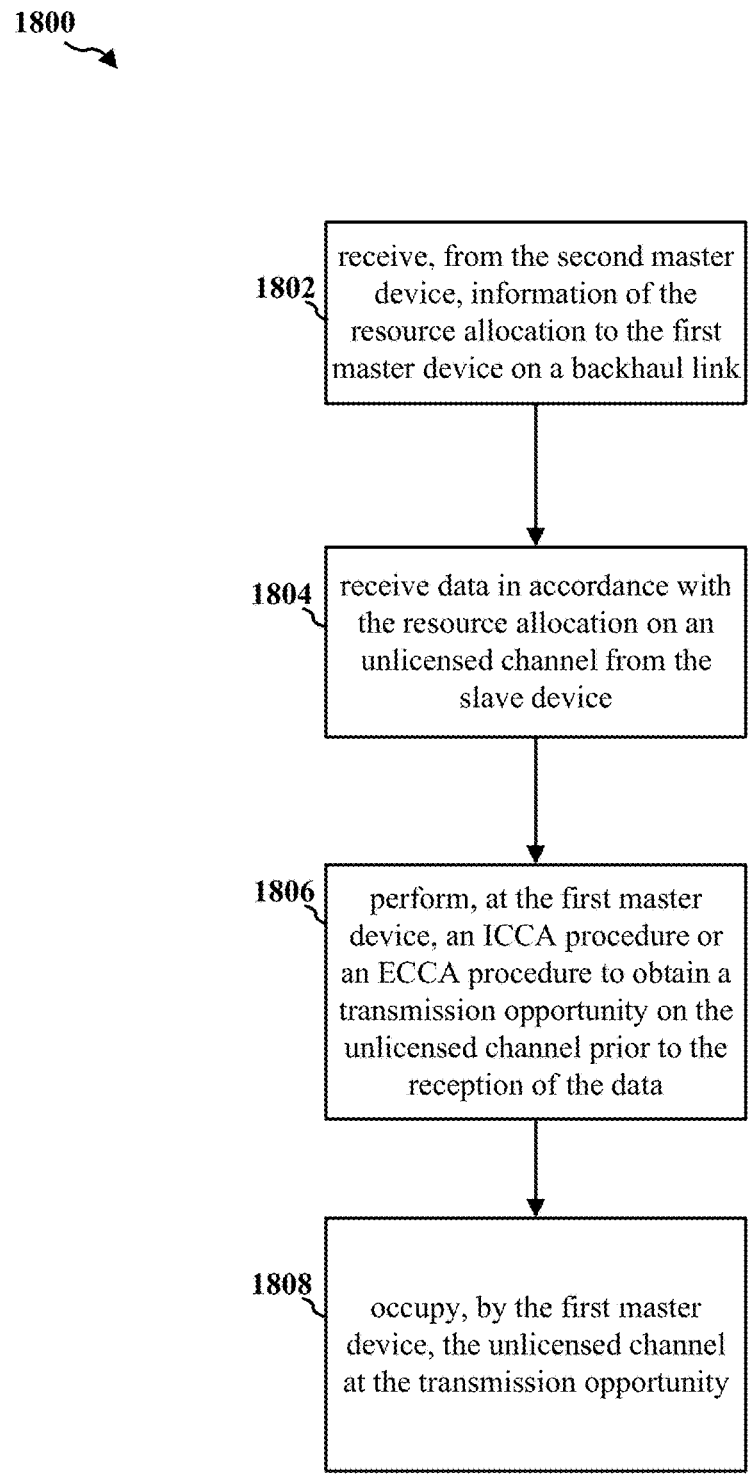
FIG. 18 is a flowchart of a method of wireless communication.

FIG. 18 is a flowchart 1800 of a method of wireless communication. The method may be performed by an eNB (e.g., the master device 704, the apparatus 1502/1502'). It should be understood that the operations indicated with dashed lines represent optional operations for various aspects of the disclosure.

At 1802, the eNB may receive, from the second master device, information of the resource allocation to the first master device on a backhaul link. For example, referring to FIG. 11, the master device 702 may transmit information regarding the resource allocation 1172 to the master device 704 through the backhaul link 780 such that the master device 704 may communicate with the slave device 706-a in accordance with the CoMP procedure. The information may include an indication that instructs the master device 704 to reserve the unlicensed channel 710 prior to, and for use of, the data communication between the master device 704 and the slave device 706-a in accordance with the resource allocation 1172. As the master device 704 will reserve the unlicensed channel 710, the resource allocation 1172 may also include an indication that instructs the slave device 706-a to perform an ICCA procedure to obtain access to the unlicensed channel 710.

At 1804, the eNB may receive data in accordance with the resource allocation on an unlicensed channel from the slave device. For example, referring to FIG. 10, For example, referring to FIG. 10, the resource allocation 1026 may indicate the slave device 706-a to transmit data to the master device 704 immediately upon receiving the resource allocation 1026 or at a particular time point. At the transmission time point, the slave device 706-a may determine whether any of the slave device 706-a and the associated devices (i.e., the master device 702 and the master device 704) is active on the unlicensed channel 710 or was active within a predetermined time period (e.g., 1, 3, or 5 observation slots). When one of the devices is active or was active with the predetermined time period, the slave device 706-a may determine to perform the ECCA procedure to obtain access to the unlicensed channel 710. In this example, based on the resource allocation 1026, the slave device 706-a determines to transmit data to the master device 702 immediately after the reception of the resource allocation 1026. The slave device 706-a further determines that the associated master device 702 was active at time point $t_8$, and accordingly performs the ECCA procedure 1034 to obtain a transmission slot on the unlicensed channel 710. The time period of the ECCA procedure 1034 may overlap with the transmission time period of the packets 1014 transmitted between the AP 912 and the STA 916. Through the ECCA procedure 1034, the slave device 706-a obtains a transmission slot at time point $t_{12}$. Accordingly, at time point $t_{12}$, the slave device 706-a communicates the subframes 1038 on the unlicensed channel 710 to the master device 704 in accordance with the resource allocation 1026.

At 1806, the eNB may perform, at the first master device, an ICCA procedure or an ECCA procedure to obtain a transmission opportunity on the unlicensed channel prior to the reception of the data. For example, referring to FIG. 11, the master device 704 determines that the unlicensed channel 710 is occupied during the ICCA procedure 1142, as the transmission period of the packets 1112 transmitted between the AP 912 and the STA 916 overlaps with the time period of the ICCA procedure 1142. Subsequently, at time point $t_6$, the master device 702 performs the ECCA procedure 1144 to obtain a transmission slot. Upon obtaining the transmission slot, from time point $t_8$, the master device 702 may transmit the signals 1146 on the unlicensed channel 710 to occupy the channel until the expected UL transmission time (i.e., time point $t_{10}$) for the slave device 706-a to transmit in accordance with the resource allocation 1172.

At 1808, the eNB may occupy, by the first master device, the unlicensed channel at the transmission opportunity. For example, referring to FIG. 11, upon obtaining the transmission slot, from time point $t_8$, the master device 702 may transmit the signals 1146 on the unlicensed channel 710 to occupy the channel until the expected UL transmission time (i.e., time point $t_{10}$) for the slave device 706-a to transmit in accordance with the resource allocation 1172.

Figure 19:
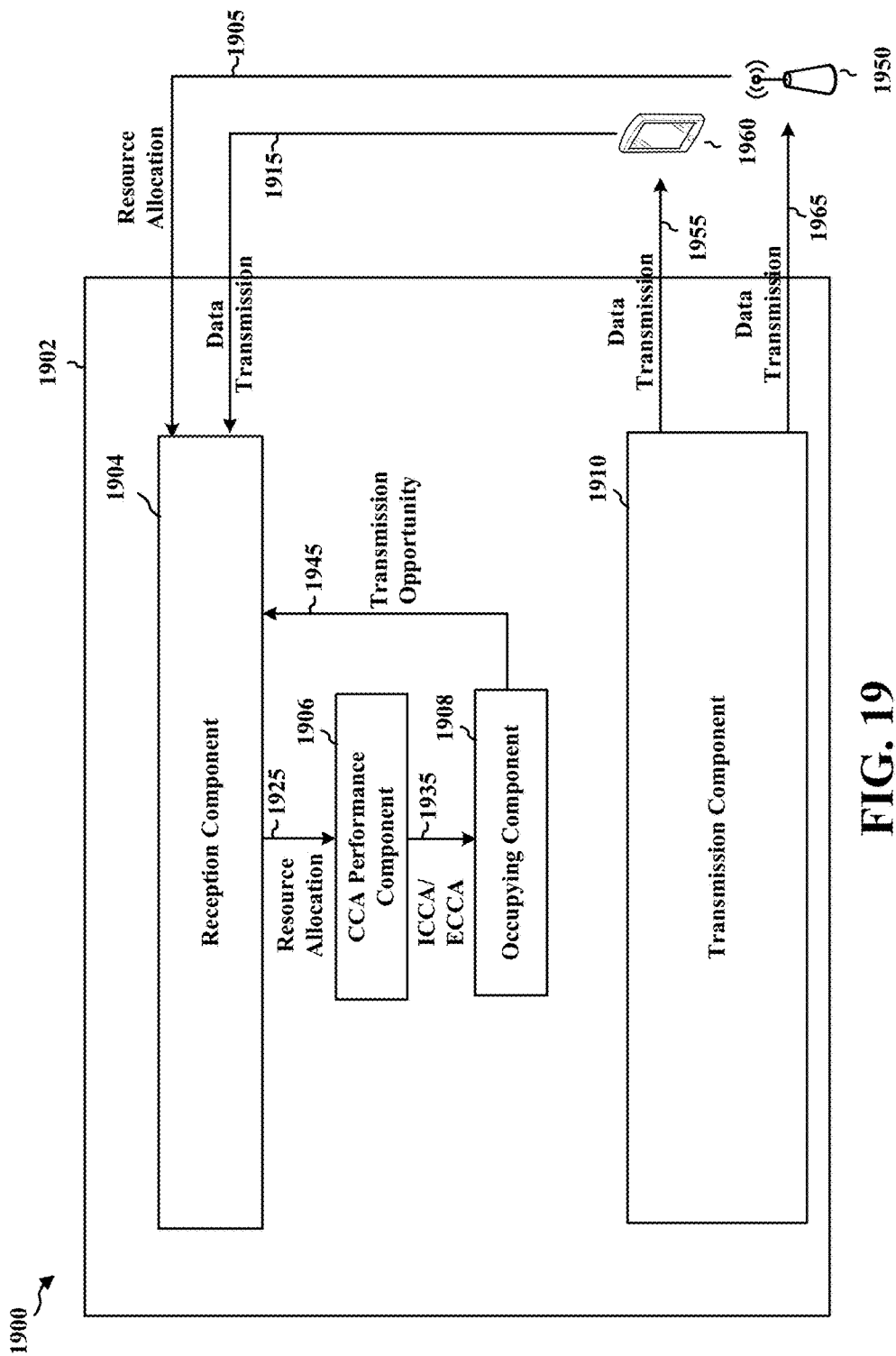
FIG. 19 is a conceptual data flow diagram illustrating the data flow between different means/components in an exemplary apparatus.

FIG. 19 is a conceptual data flow diagram 1900 illustrating the data flow between different means/components in an exemplary apparatus 1902. The apparatus may be an eNB. The apparatus includes a reception component 1904 that receives information 1905 associated with a resource allocation of a slave device from a master device 1950. In addition, the reception component 1904 receives data transmissions 1915 from the slave device 1960 on a licensed or unlicensed channel. In addition, the apparatus includes CCA performance component 1906 that performs an ICCA procedure or an ECCA procedure to obtain a transmission opportunity on the unlicensed channel prior to the reception of the data transmissions. In an aspect, the CCA performance component 1906 may use information associated with the resource allocation 1925 received from the reception component 1904 to obtain the transmission opportunity. The apparatus also includes an occupying component 1908 that occupies the unlicensed channel at the transmission opportunity 1945 based on information associated with the ICCA/ECCA 1935. The apparatus further includes a transmission component 1910 that sends data transmissions 1955, 1965 to the master device 1950 and the slave device 1960.

The apparatus may include additional components that perform each of the blocks of the algorithm in the aforementioned flowchart of FIG. 18. As such, each block in the aforementioned flowchart of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
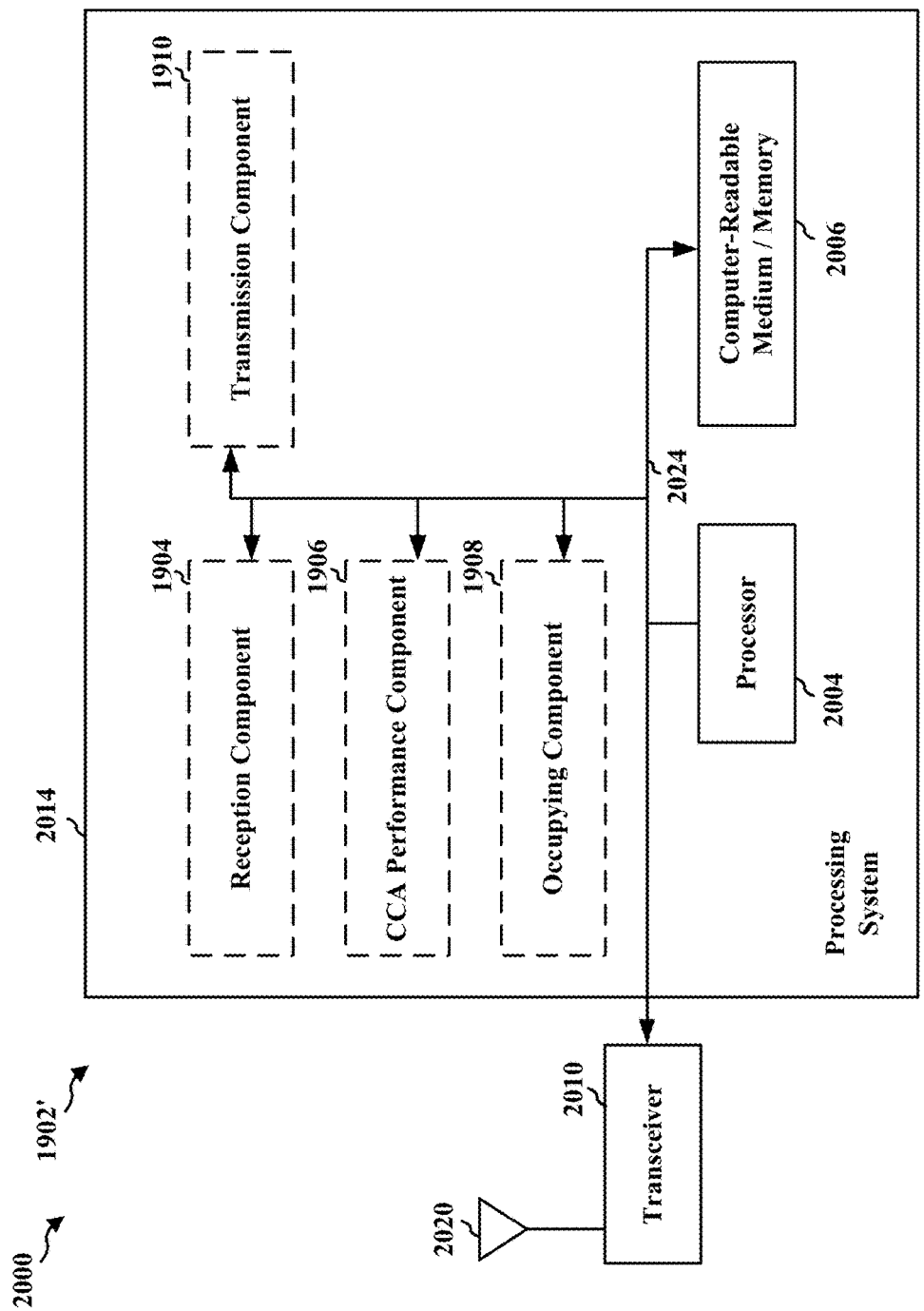
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, 1910, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1910, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906, 1908, 1910. The components may be software components running in the processor 2004, resident/stored in the computer readable medium/memory 2006, one or more hardware components coupled to the processor 2004, or some combination thereof. The processing system 2014 may be a component of the eNB 310 and may include the memory 376 and/or at least one of the TX processor 316, the RX processor 370, and the controller/processor 375.

In one configuration, the apparatus 1902/1902' for wireless communication includes means for receiving, from the second master device, information of the resource allocation to the first master device on a backhaul link. In an aspect, the resource allocation is transmitted on a licensed channel, and the information of the resource allocation includes an indication to reserve the unlicensed channel. In another configuration, the apparatus 1902/1902' for wireless communication includes means for receiving data in accordance with the resource allocation on an unlicensed channel from the slave device. In a further aspect, the apparatus 1902/1902' for wireless communication includes means for performing, at the first master device, an ICCA procedure or an ECCA procedure to obtain a transmission opportunity on the unlicensed channel prior to the reception of the data. In another configuration, the apparatus 1902/1902' for wireless communication includes means for occupying, by the first master device, the unlicensed channel at the transmission opportunity. In one aspect, the slave device is a user equipment. In a further aspect, the first master device includes a first macro eNB, a first RRH, or a first femto cell. In another aspect, the second master device includes one of a second eNB, a second RRH, or a second femto cell. The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a slave device, wherein the slave device is associated with a first master device and a second master device, comprising:
   receiving, from the first master device, a resource allocation for communicating with the second master device, the second master device being different than the first master device;
   determining a type of clear channel assessment (CCA) procedure to perform before communicating with the second master device on an unlicensed channel;
   performing a CCA procedure to obtain a transmission opportunity based on the determining, the CCA procedure being one of an initial CCA (ICCA) procedure or an extended CCA (ECCA) procedure; and
   transmitting data to the second master device in accordance with the resource allocation on the unlicensed channel when the transmission opportunity is obtained.

2. The method of claim 1, wherein the slave device determines the type of CCA procedure to perform based on at least one of:
   an indicator included in the resource allocation,
   configuration information provided by the first master device prior to receiving the resource allocation,
   whether the first master device or the second master device reserved the unlicensed channel for the transmitting by the slave device,
   whether the resource allocation was received on the unlicensed channel or another channel, or
   whether the resource allocation was received on the unlicensed channel or a licensed channel.

3. The method of claim 1, wherein the resource allocation is received on at least one of the unlicensed channel or a licensed channel.

4. The method of claim 1, wherein the resource allocation is further for communicating with the first master device,
   wherein the transmitting further includes transmitting the data to the first master device in accordance with the resource allocation.

5. The method of claim 1, wherein the resource allocation is further for communicating with the first master device,
   wherein the transmitting further includes transmitting other data to the first master device in accordance with the resource allocation.

6. The method of claim 1, wherein the slave device is a user equipment,
   wherein the first master device includes a first macro evolved NodeB (eNB), a first radio resource head (RRH), or a first femto cell, and
   wherein the second master device includes one of a second eNB, a second RRH, or a second femto cell.

7. A method of wireless communication of a first master device, wherein the first master device is in communication is with a slave device and a second master device, comprising:
   transmitting a resource allocation to a slave device for communicating with the second master device, the second master device being different than the first master device;
   transmitting information of the resource allocation to the second master device on a backhaul link; and
   indicating a clear channel assessment (CCA) type and CCA parameters to the slave device by at least one of:
   providing configuration information in a communication prior to transmitting the resource allocation;
   setting an indicator in the resource allocation;
   transmitting the resource allocation on a type of channel; or
   transmitting the resource allocation on a selected channel.

8. The method of claim 7, wherein:
   the slave device is a user equipment,
   the first master device includes a first macro evolved NodeB (eNB), a first radio resource head (RRH), or a first femto cell, and
   the second master device includes one of a second eNB, a second RRH, or a second femto cell.

9. A method of wireless communication of a first master device, wherein the first master device is in communication with a second master device and a slave device, comprising:
   receiving, from the second master device, information of a resource allocation to the first master device on a backhaul link, the resource allocation being transmitted on a licensed channel, and the information of the resource allocation including an indication to reserve the unlicensed channel;

receiving data in accordance with the resource allocation on an unlicensed channel from the slave device;

performing, at the first master device, an initial CCA (ICCA) procedure or an extended CCA (ECCA) procedure to obtain a transmission opportunity on the unlicensed channel prior to the reception of the data; and occupying, by the first master device, the unlicensed channel immediately prior to the transmission opportunity.

10. The method of claim 9, wherein:
the slave device is a user equipment,
the first master device includes a first macro evolved NodeB (eNB), a first radio resource head (RRH), or a first femto cell, and
the second master device includes one of a second eNB, a second RRH, or a second femto cell.

11. An apparatus for wireless communication, wherein the apparatus is a slave device that is associated with a first master device and a second master device, comprising:
means for receiving, from the first master device, a resource allocation for communicating with the second master device, the second master device being different than the first master device;
means for determining a type of clear channel assessment (CCA) procedure to perform before communicating with the second master device on an unlicensed channel;
means for performing a CCA procedure to obtain a transmission opportunity based on the determining, the CCA procedure being one of an initial CCA (ICCA) procedure or an extended CCA (ECCA) procedure; and
means for transmitting data to the second master device in accordance with the resource allocation on the unlicensed channel when the transmission opportunity is obtained.

12. The apparatus of claim 11, wherein the means for determining is configured to determine the type of CCA procedure to perform based on at least one of:
an indicator included in the resource allocation,
configuration information provided by the first master device prior to receiving the resource allocation,
whether the first master device or the second master device reserved the unlicensed channel for the transmitting by the slave device,
whether the resource allocation was received on the unlicensed channel or another channel, or
whether the resource allocation was received on the unlicensed channel or a licensed channel.

13. The apparatus of claim 11, wherein the resource allocation is received on at least one of the unlicensed channel or a licensed channel.

14. The apparatus of claim 11, wherein the resource allocation is further for communicating with the first master device,
wherein the means for transmitting is configured to transmit the data to the first master device in accordance with the resource allocation.

15. The apparatus of claim 11, wherein the resource allocation is further for communicating with the first master device,
wherein the means for transmitting is configured to transmit other data to the first master device in accordance with the resource allocation.

16. The apparatus of claim 11, wherein the slave device is a user equipment,
wherein the first master device includes a first macro evolved NodeB (eNB), a first radio resource head (RRH), or a first femto cell, and
wherein the second master device includes one of a second eNB, a second RRH, or a second femto cell.

17. An apparatus for wireless communication, wherein the apparatus is a first master device that is in communication is with a slave device and a second master device, comprising:
means for transmitting a resource allocation to a slave device for communicating with the second master device, the second master device being different than the first master device;
means for transmitting information of the resource allocation to the second master device on a backhaul link; and
means for indicating a clear channel assessment (CCA) type and CCA parameters to the slave device, wherein the means for indicating is configured to:
provide configuration information in a communication prior to transmitting the resource allocation;
set an indicator in the resource allocation;
transmit the resource allocation on a type of channel; or
transmit the resource allocation on a selected channel.

18. The apparatus of claim 17, wherein:
the slave device is a user equipment,
the first master device includes a first macro evolved NodeB (eNB), a first radio resource head (RRH), or a first femto cell, and
the second master device includes one of a second eNB, a second RRH, or a second femto cell.

19. An apparatus for wireless communication, wherein apparatus is a first master device that is in communication with a second master device and a slave device, comprising:
means for receiving, from the second master device, information of a resource allocation to the first master device on a backhaul link, the resource allocation being transmitted on a licensed channel, and the information of the resource allocation including an indication to reserve the unlicensed channel;
means for receiving data in accordance with the resource allocation on an unlicensed channel from the slave device;
means for performing, at the first master device, an initial CCA (ICCA) procedure or an extended CCA (ECCA) procedure to obtain a transmission opportunity on the unlicensed channel prior to the reception of the data; and
means for occupying, by the first master device, the unlicensed channel at the transmission opportunity.

20. The apparatus of claim 19, wherein:
the slave device is a user equipment,
the first master device includes a first macro evolved NodeB (eNB), a first radio resource head (RRH), or a first femto cell, and
the second master device includes one of a second eNB, a second RRH, or a second femto cell.

21. An apparatus for wireless communication, the apparatus being a slave device that is associated with a first master device and a second master device, comprising:
a memory; and
at least one processor coupled to the memory and configured to:

receive, from the first master device, a resource allocation for communicating with the second master device, the second master device being different than the first master device;

determine a type of clear channel assessment (CCA) procedure to perform before communicating with the second master device on an unlicensed channel;

perform a CCA procedure to obtain a transmission opportunity based on the determining, the CCA procedure being one of an initial CCA (ICCA) procedure or an extended CCA (ECCA) procedure; and transmit data to the second master device in accordance with the resource allocation on the unlicensed channel when the transmission opportunity is obtained.

22. An apparatus for wireless communication, the apparatus being a first master device in communication with a second master device and a slave device, comprising:

a memory; and at least one processor coupled to the memory and configured to:

transmit a resource allocation to a slave device for communicating with the second master device, the second master device being different than the first master device;

transmit information of the resource allocation to the second master device on a backhaul link; and indicate a clear channel assessment (CCA) type and CCA parameters to the slave device by at least one of:

providing configuration information in a communication prior to transmitting the resource allocation;

setting an indicator in the resource allocation;

transmitting the resource allocation on a type of channel; or transmitting the resource allocation on a selected channel.

23. An apparatus for wireless communication, the apparatus being a first master device in communication with a second master device and a slave device, comprising:

a memory; and at least one processor coupled to the memory and configured to:

receive, from the second master device, information of a resource allocation to the first master device on a backhaul link, the resource allocation being transmitted on a licensed channel, and the information of the resource allocation including an indication to reserve the unlicensed channel;

receive data in accordance with the resource allocation on an unlicensed channel from the slave device;

perform, at the first master device, an initial CCA (ICCA) procedure or an extended CCA (ECCA) procedure to obtain a transmission opportunity on the unlicensed channel prior to the reception of the data; and occupy, by the first master device, the unlicensed channel at the transmission opportunity.

24. A non-transitory computer-readable medium storing computer executable code for a slave device that is in communication with a first master device and a second master device, comprising code to:

receive, from the first master device, a resource allocation for communicating with the second master device, the second master device being different than the first master device;

determine a type of clear channel assessment (CCA) procedure to perform before communicating with the second master device on an unlicensed channel;

perform a CCA procedure to obtain a transmission opportunity based on the determining, the CCA procedure being one of an initial CCA (ICCA) procedure or an extended CCA (ECCA) procedure; and transmit data to the second master device in accordance with the resource allocation on the unlicensed channel when the transmission opportunity is obtained.

25. A non-transitory computer-readable medium storing computer executable code for a first master device that is in communication with a slave device and a second master device, comprising code to:

transmit a resource allocation to the slave device for communicating with the second master device, the second master device being different than the first master device;

transmit information of the resource allocation to the second master device on a backhaul link; and indicate a clear channel assessment (CCA) type and CCA parameters to the slave device by at least one of:

providing configuration information in a communication prior to transmitting the resource allocation;

setting an indicator in the resource allocation;

transmitting the resource allocation on a type of channel; or transmitting the resource allocation on a selected channel.

26. A non-transitory computer-readable medium storing computer executable code for a first master device that is in communication with a second master device and a slave device, comprising code to:

receive, from the second master device, information of a resource allocation to the first master device on a backhaul link, the resource allocation being transmitted on a licensed channel, and the information of the resource allocation including an indication to reserve the unlicensed channel;

receive data in accordance with the resource allocation on an unlicensed channel from the slave device;

perform, at the first master device, an initial CCA (ICCA) procedure or an extended CCA (ECCA) procedure to obtain a transmission opportunity on the unlicensed channel prior to the reception of the data; and occupy, by the first master device, the unlicensed channel at the transmission opportunity.

\* \* \* \* \*